US007681732B2

(12) United States Patent
Moehlenbrock et al.

(10) Patent No.: US 7,681,732 B2
(45) Date of Patent: Mar. 23, 2010

(54) LAMINATED LIDSTOCK

(75) Inventors: Andrew W. Moehlenbrock, Simpsonville, SC (US); Debra C. Karam, Pelzer, SC (US); Douglas Wilson, Fountain Inn, SC (US); Chad Stephens, Moore, SC (US)

(73) Assignee: Cryovac, Inc., Duncan, SC (US)

( * ) Notice: Subject to any disclaimer, the term of this patent is extended or adjusted under 35 U.S.C. 154(b) by 0 days.

(21) Appl. No.: 12/157,902

(22) Filed: Jun. 13, 2008

(65) Prior Publication Data
US 2009/0178945 A1 Jul. 16, 2009

Related U.S. Application Data

(60) Provisional application No. 61/010,790, filed on Jan. 11, 2008.

(51) Int. Cl.
*B65D 75/52* (2006.01)
(52) U.S. Cl. .................. 206/459.1; 206/807; 428/42.1; 428/915; 53/412
(58) Field of Classification Search .............. 206/459.1, 206/459.5, 807; 428/40.1, 41.8, 42.1, 42.2, 428/42.3, 915; 283/100, 101; 53/410, 411, 53/412, 445, 450, 455
See application file for complete search history.

(56) References Cited
U.S. PATENT DOCUMENTS

| 1,924,511 A | 8/1933 | Peterson |
| 1,927,463 A | 9/1933 | McIntosh |
| 2,179,663 A | 10/1955 | Meyer-Jagenberg |
| 3,426,959 A | 2/1969 | Lemelson |
| 3,650,386 A | 3/1972 | Tigner |
| 3,655,503 A | 4/1972 | Stanley et al. |
| 3,942,713 A | 3/1976 | Olson et al. |
| 4,058,632 A | 11/1977 | Evans et al. |
| 4,156,493 A | 5/1979 | Julius |

(Continued)

FOREIGN PATENT DOCUMENTS

EP 0 661 154 B1 12/1994

(Continued)

OTHER PUBLICATIONS

PCT International Search Report and Written Opinion of International Searching Authority, mailed May 6, 2009, re: PCT/US2009/000076 (12 pages).

(Continued)

*Primary Examiner*—Jacob K Ackun, Jr.
(74) *Attorney, Agent, or Firm*—Mark B. Quatt

(57) ABSTRACT

A laminated lidstock includes a substrate film, a support web; a pressure sensitive adhesive disposed between the substrate and support webs, and covering the substrate film and support web except for a clear area disposed near one end of the laminated lidstock; a first die cut disposed in the substrate film; a second die cut disposed in the support web; a pull tab; and a tamper evidence device including an end portion of the support web, defined by a first end, a first side edge, and a second side edge of the package made from the laminated lidstock, and the second die cut, capable of indicating tampering of the package upon removal of the tamper evidence device from the support web; wherein at least one of the substrate film and the support web carries a registration device.

20 Claims, 23 Drawing Sheets

U.S. PATENT DOCUMENTS

| | | | |
|---|---|---|---|
| 4,189,519 A | 2/1980 | Ticknor | |
| 4,252,846 A | 2/1981 | Romesberg et al. | |
| 4,318,506 A | 3/1982 | Hirsch | |
| 4,411,365 A | 10/1983 | Horikawa et al. | |
| 4,433,808 A | 2/1984 | Gordon et al. | |
| 4,464,154 A | 8/1984 | Ljungcrantz | |
| 4,521,467 A | 6/1985 | Berger | |
| 4,538,396 A | 9/1985 | Nakamura | |
| 4,548,852 A | 10/1985 | Mitchell | |
| 4,550,141 A | 10/1985 | Hoh | |
| 4,552,269 A | 11/1985 | Chang | |
| 4,576,285 A | 3/1986 | Goglio | |
| 4,610,357 A | 9/1986 | Nakamura | |
| 4,615,926 A | 10/1986 | Hsu et al. | |
| 4,616,470 A | 10/1986 | Nakamura | |
| 4,651,874 A | 3/1987 | Nakamura | |
| 4,653,250 A | 3/1987 | Nakamura | |
| 4,666,778 A | 5/1987 | Hwo | |
| 4,667,453 A | 5/1987 | Goglio | |
| 4,679,693 A | 7/1987 | Forman | |
| 4,723,301 A | 2/1988 | Chang | |
| 4,729,476 A | 3/1988 | Lulham et al. | |
| 4,739,879 A | 4/1988 | Nakamura | |
| 4,784,885 A | 11/1988 | Carespodi | |
| 4,785,940 A | 11/1988 | Wilson | |
| 4,786,190 A | 11/1988 | Van Erden et al. | |
| 4,790,436 A | 12/1988 | Nakamura | |
| 4,840,270 A | 6/1989 | Caputo et al. | |
| 4,848,575 A | 7/1989 | Nakamura et al. | |
| 4,859,514 A | 8/1989 | Friedrich et al. | |
| 4,871,265 A | 10/1989 | Peck | |
| 4,875,587 A | 10/1989 | Lulham et al. | |
| 4,882,229 A | 11/1989 | Hwo | |
| 4,902,142 A | 2/1990 | Lammert et al. | |
| 4,916,190 A | 4/1990 | Hwo | |
| 4,937,139 A | 6/1990 | Genske et al. | |
| 4,944,409 A | 7/1990 | Busche et al. | |
| 4,946,038 A | 8/1990 | Eaton | |
| 5,023,121 A | 6/1991 | Pockat et al. | |
| 5,024,044 A | 6/1991 | Friedrich et al. | |
| 5,044,772 A | 9/1991 | Larson | |
| 5,048,718 A | 9/1991 | Nakamura | |
| 5,065,868 A | 11/1991 | Cornelissen et al. | |
| 5,076,424 A | 12/1991 | Nakamura | |
| 5,077,064 A | 12/1991 | Hustad et al. | |
| 5,089,320 A | 2/1992 | Straus et al. | |
| 5,105,603 A | 4/1992 | Natterer | |
| 5,128,414 A | 7/1992 | Hwo | |
| 5,154,293 A | 10/1992 | Gould | |
| 5,161,350 A | 11/1992 | Nakamura | |
| 5,167,455 A | 12/1992 | Forman | |
| 5,287,961 A | 2/1994 | Herran | |
| 5,335,478 A | 8/1994 | Aronsen | |
| 5,344,007 A | 9/1994 | Nakamura et al. | |
| 5,346,301 A | 9/1994 | Scarberry et al. | |
| 5,379,897 A | 1/1995 | Muckenfuhs et al. | |
| 5,388,757 A | 2/1995 | Lorenzen | |
| 5,409,116 A | 4/1995 | Aronsen | |
| 5,445,838 A | 8/1995 | Lipinski et al. | |
| 5,476,323 A | 12/1995 | Gold | |
| 5,503,858 A | 4/1996 | Reskow | |
| 5,545,420 A | 8/1996 | Lipinski et al. | |
| 5,547,752 A | 8/1996 | Yanidis | |
| 5,595,786 A | 1/1997 | McBride, Jr. et al. | |
| 5,604,000 A | 2/1997 | May | |
| 5,664,677 A | 9/1997 | O'Connor | |
| 5,688,394 A | 11/1997 | McBride, Jr. et al. | |
| 5,741,075 A | 4/1998 | Collins et al. | |
| 5,749,658 A | 5/1998 | Kettner | |
| 5,836,697 A | 11/1998 | Chiesa | |
| 5,855,434 A | 1/1999 | Hagen | |
| 5,855,435 A | 1/1999 | Chiesa | |
| 5,873,483 A | 2/1999 | Görtz et al. | |
| 5,882,749 A | 3/1999 | Jones et al. | |
| 5,908,246 A | 6/1999 | Arimura et al. | |
| 5,938,013 A | 8/1999 | Palumbo et al. | |
| 5,945,145 A | 8/1999 | Narsutis et al. | |
| 5,997,968 A | 12/1999 | Dries et al. | |
| 6,015,045 A | 1/2000 | Joseph et al. | |
| 6,026,953 A | 2/2000 | Nakamura et al. | |
| 6,048,100 A | 4/2000 | Thrall et al. | |
| 6,056,141 A | 5/2000 | Navarini et al. | |
| 6,065,591 A | 5/2000 | Dill et al. | |
| 6,076,969 A | 6/2000 | Jaisle et al. | |
| 6,106,153 A | 8/2000 | Toshima | |
| 6,113,271 A | 9/2000 | Scott et al. | |
| 6,164,441 A | 12/2000 | Guy et al. | |
| 6,177,172 B1 | 1/2001 | Yeager | |
| 6,245,176 B1 | 6/2001 | Greenland | |
| 6,254,519 B1 | 7/2001 | Toshima | |
| D447,054 S | 8/2001 | Hill | |
| 6,270,257 B1 | 8/2001 | Yeager | |
| 6,273,610 B1 | 8/2001 | Koyama et al. | |
| 6,279,297 B1 | 8/2001 | Latronico | |
| 6,279,298 B1 | 8/2001 | Thomas et al. | |
| 6,294,210 B1 | 9/2001 | Kuo | |
| 6,309,105 B1 | 10/2001 | Palumbo | |
| 6,325,541 B1 | 12/2001 | Thrall et al. | |
| 6,375,067 B1 | 4/2002 | Moriyama | |
| 6,383,592 B1 | 5/2002 | Lowry et al. | |
| 6,416,833 B1 | 7/2002 | Climenhage et al. | |
| 6,427,421 B1 | 8/2002 | Belmont et al. | |
| 6,428,867 B1 | 8/2002 | Scott et al. | |
| 6,450,685 B1 | 9/2002 | Scott | |
| 6,461,708 B1 | 10/2002 | Dronzek | |
| 6,476,137 B1 | 11/2002 | Longo | |
| 6,486,401 B1 | 11/2002 | Warhurst et al. | |
| 6,502,986 B1 | 1/2003 | Bensur et al. | |
| 6,554,134 B1 | 4/2003 | Guibert | |
| 6,589,622 B1 * | 7/2003 | Scott | 428/40.1 |
| 6,662,843 B1 | 12/2003 | Johnson | |
| 6,688,078 B2 | 2/2004 | Mauclair et al. | |
| 6,706,389 B1 | 3/2004 | Bates et al. | |
| 6,722,106 B2 | 4/2004 | Bartel et al. | |
| 6,726,054 B2 | 4/2004 | Fagen et al. | |
| 6,793,077 B1 * | 9/2004 | Kancsar et al. | 206/531 |
| 6,865,860 B2 | 3/2005 | Arakawa et al. | |
| 6,911,255 B2 | 6/2005 | Posey et al. | |
| 6,918,532 B2 | 7/2005 | Sierra-Gomez et al. | |
| 6,925,779 B2 | 8/2005 | Thieman | |
| 6,929,141 B1 | 8/2005 | Minghetti | |
| 6,929,400 B2 | 8/2005 | Razeti et al. | |
| 6,968,952 B2 | 11/2005 | Crevier et al. | |
| 6,974,256 B2 | 12/2005 | Kinigakis et al. | |
| 6,978,889 B2 | 12/2005 | McBride | |
| 7,007,423 B2 | 3/2006 | Andersson et al. | |
| 7,007,801 B2 | 3/2006 | Mangold et al. | |
| 7,051,877 B2 | 5/2006 | Lin | |
| 7,101,079 B2 | 9/2006 | Strand et al. | |
| 7,104,419 B2 | 9/2006 | Fagen et al. | |
| 7,118,003 B2 | 10/2006 | Sellari et al. | |
| 7,134,788 B2 | 11/2006 | Hsiang | |
| 7,163,338 B2 | 1/2007 | McCracken et al. | |
| 7,163,706 B2 | 1/2007 | Shepard et al. | |
| 7,165,887 B2 | 1/2007 | Strand et al. | |
| 7,165,888 B2 | 1/2007 | Rodick | |
| 7,175,582 B2 | 2/2007 | Owen | |
| RE39,505 E | 3/2007 | Thomas et al. | |
| 7,207,718 B2 | 4/2007 | Machacek | |
| 7,216,764 B2 | 5/2007 | Forman | |
| 7,217,033 B2 | 5/2007 | Pritchard | |
| 7,244,223 B2 | 7/2007 | Hartman et al. | |
| 7,244,496 B2 | 7/2007 | Huffer | |
| 7,266,934 B2 | 9/2007 | Leighton | |

| | | |
|---|---|---|
| 7,299,608 B2 | 11/2007 | Kohl et al. |
| 7,305,805 B2 | 12/2007 | Dierl et al. |
| 7,311,649 B1 | 12/2007 | Plourde |
| 7,314,312 B2 | 1/2008 | Soderholm |
| 7,314,669 B2 | 1/2008 | Galloway |
| 7,320,545 B2 | 1/2008 | Strand et al. |
| 7,320,662 B2 | 1/2008 | Thieman |
| 7,322,473 B2 * | 1/2008 | Fux .................. 206/459.1 |
| 7,325,378 B2 | 2/2008 | Ausnit |
| 7,325,686 B2 | 2/2008 | Aldridge |
| 7,328,543 B2 | 2/2008 | Hoffman et al. |
| 7,329,217 B2 | 2/2008 | Leighton |
| 7,331,160 B2 | 2/2008 | Melchoir |
| 7,341,085 B2 | 3/2008 | Tinivella |
| 7,341,160 B2 | 3/2008 | Cappel et al. |
| 7,344,744 B2 | 3/2008 | Sierra-Gomez et al. |
| 7,350,688 B2 | 4/2008 | Sierra-Gomez et al. |
| 7,351,188 B2 | 4/2008 | Schaller et al. |
| 7,354,635 B2 | 4/2008 | Malfait et al. |
| 7,364,779 B2 | 4/2008 | Nomula |
| RE40,284 E | 5/2008 | Thomas et al. |
| 7,367,931 B2 | 5/2008 | Barclay et al. |
| 7,374,053 B2 | 5/2008 | Herald et al. |
| 7,383,675 B2 | 6/2008 | Thieman |
| 7,384,195 B2 | 6/2008 | Johansen |
| 7,395,642 B2 | 7/2008 | Plourde et al. |
| 7,396,163 B2 | 7/2008 | McGregor |
| 7,404,787 B2 | 7/2008 | Haws |
| 7,406,810 B2 | 8/2008 | Clune et al. |
| 7,413,535 B2 | 8/2008 | Schneider |
| 7,419,301 B2 | 9/2008 | Schneider et al. |
| 7,422,142 B2 | 9/2008 | Arippol |
| 7,422,782 B2 | 9/2008 | Haedt et al. |
| 7,455,636 B2 | 11/2008 | Leighton |
| 7,465,265 B2 | 12/2008 | Hinesley |
| 7,481,580 B2 | 1/2009 | Schreiter |
| 7,503,696 B2 | 3/2009 | Ha et al. |
| 7,506,487 B2 | 3/2009 | Eads et al. |
| 7,506,488 B2 | 3/2009 | Thomas et al. |
| 7,527,839 B2 | 5/2009 | Busche et al. |
| 7,527,842 B2 | 5/2009 | Mathy et al. |
| 7,530,740 B2 | 5/2009 | Geyer |
| 7,537,387 B2 | 5/2009 | Spork et al. |
| 7,549,269 B2 | 6/2009 | Woodham et al. |
| 7,553,083 B2 | 6/2009 | Plourde |
| D597,857 S | 8/2009 | Lin |
| 7,568,589 B2 | 8/2009 | Vovan |
| 7,585,111 B2 | 9/2009 | Turvey et al. |
| 7,585,444 B2 | 9/2009 | Baranowske, III et al. |
| 7,597,657 B2 | 10/2009 | Yeager |
| 7,600,641 B2 | 10/2009 | Burgess |
| 7,604,407 B2 | 10/2009 | Bois |
| 2002/0134046 A1 | 9/2002 | Bois |
| 2002/0152719 A1 | 10/2002 | Kinigakis et al. |
| 2002/0182359 A1 | 12/2002 | Muir, Jr. et al. |
| 2003/0022778 A1 | 1/2003 | Schneider |
| 2003/0183643 A1 | 10/2003 | Fagen et al. |
| 2003/0230532 A1 | 12/2003 | Rosenblatt et al. |
| 2004/0025476 A1 | 2/2004 | Oliverio et al. |
| 2004/0032994 A1 | 2/2004 | Marschall et al. |
| 2004/0077759 A1 | 4/2004 | Bardiot et al. |
| 2004/0083685 A1 | 5/2004 | Knoerzer et al. |
| 2004/0136619 A1 | 7/2004 | Spork et al. |
| 2004/0166262 A1 | 8/2004 | Busche et al. |
| 2004/0232029 A1 | 11/2004 | Cotert |
| 2005/0000965 A1 | 1/2005 | Boardman |
| 2005/0011898 A1 | 1/2005 | Van Handel et al. |
| 2005/0025395 A1 | 2/2005 | Howell et al. |
| 2005/0063624 A1 | 3/2005 | Goto et al. |
| 2005/0181205 A1 | 8/2005 | Story |
| 2005/0238265 A1 | 10/2005 | Schneider et al. |
| 2005/0247764 A1 | 11/2005 | Sierra-Gomez et al. |
| 2005/0276525 A1 | 12/2005 | Hebert et al. |
| 2005/0284776 A1 | 12/2005 | Kobayashi et al. |
| 2005/0286817 A1 | 12/2005 | Hall et al. |
| 2006/0018569 A1 | 1/2006 | Bonenfant |
| 2006/0083446 A1 | 4/2006 | Sampaio |
| 2006/0088677 A1 | 4/2006 | Mathy et al. |
| 2006/0093765 A1 | 5/2006 | Mueller |
| 2006/0113305 A1 | 6/2006 | Ferrazzi |
| 2006/0131311 A1 | 6/2006 | Wang |
| 2006/0141196 A1 * | 6/2006 | Utz .................. 428/40.1 |
| 2006/0171611 A1 | 8/2006 | Rapparini |
| 2006/0172131 A1 | 8/2006 | Haedt et al. |
| 2006/0182909 A1 | 8/2006 | Ichikawa et al. |
| 2006/0183812 A1 | 8/2006 | Miller et al. |
| 2006/0228054 A1 | 10/2006 | Anzini et al. |
| 2006/0234014 A1 | 10/2006 | Liu et al. |
| 2006/0246184 A1 | 11/2006 | Rietjens et al. |
| 2006/0251341 A1 | 11/2006 | Sampaio |
| 2006/0251342 A1 | 11/2006 | Forman |
| 2006/0257611 A1 | 11/2006 | Chiesa |
| 2006/0285778 A1 | 12/2006 | May et al. |
| 2006/0286356 A1 | 12/2006 | Thomas et al. |
| 2006/0287181 A1 | 12/2006 | Yeager |
| 2006/0291756 A1 | 12/2006 | Thomas et al. |
| 2007/0023436 A1 | 2/2007 | Sierra-Gomez et al. |
| 2007/0039951 A1 | 2/2007 | Cole |
| 2007/0059464 A1 | 3/2007 | Huffer |
| 2007/0062161 A1 | 3/2007 | Dierl et al. |
| 2007/0080078 A1 | 4/2007 | Hansen et al. |
| 2007/0082161 A1 | 4/2007 | Cruz et al. |
| 2007/0084142 A1 | 4/2007 | Matthews |
| 2007/0086683 A1 | 4/2007 | Yeager |
| 2007/0087152 A1 | 4/2007 | Riggs |
| 2007/0104395 A1 | 5/2007 | Kinigakis et al. |
| 2007/0104398 A1 | 5/2007 | Ours |
| 2007/0110340 A1 | 5/2007 | Buchman |
| 2007/0114144 A1 | 5/2007 | Suzuki et al. |
| 2007/0116388 A1 | 5/2007 | Kuge et al. |
| 2007/0140599 A1 | 6/2007 | Dalgleish et al. |
| 2007/0141287 A1 * | 6/2007 | Laaksonen et al. ......... 428/40.1 |
| 2007/0151210 A1 | 7/2007 | Ausnit |
| 2007/0187946 A1 | 8/2007 | Shaieb |
| 2007/0212504 A1 | 9/2007 | Engelaere |
| 2007/0230834 A1 | 10/2007 | Schneider |
| 2007/0231571 A1 | 10/2007 | Lane et al. |
| 2007/0237431 A1 | 10/2007 | Perell |
| 2007/0261215 A1 | 11/2007 | Leighton |
| 2007/0271874 A1 | 11/2007 | Leighton |
| 2007/0275133 A1 | 11/2007 | Sierra-Gomez et al. |
| 2008/0000200 A1 | 1/2008 | Dierl et al. |
| 2008/0013869 A1 | 1/2008 | Forman |
| 2008/0031552 A1 | 2/2008 | Tanaka et al. |
| 2008/0031554 A1 | 2/2008 | Taheri |
| 2008/0037911 A1 | 2/2008 | Cole et al. |
| 2008/0044110 A1 | 2/2008 | Garger |
| 2008/0050055 A1 | 2/2008 | Austreng et al. |
| 2008/0056622 A1 | 3/2008 | Austreng et al. |
| 2008/0060751 A1 | 3/2008 | Arrindell |
| 2008/0063321 A1 | 3/2008 | Hodson et al. |
| 2008/0063821 A1 | 3/2008 | Galloway |
| 2008/0073349 A1 | 3/2008 | Ellswood et al. |
| 2008/0089618 A1 | 4/2008 | Blythe |
| 2008/0089620 A1 | 4/2008 | Schneider et al. |
| 2008/0098693 A1 | 5/2008 | Bohn et al. |
| 2008/0105572 A1 | 5/2008 | Cappel et al. |
| 2008/0107879 A1 | 5/2008 | Kliesch et al. |
| 2008/0118609 A1 | 5/2008 | Harlfinger |
| 2008/0118688 A1 | 5/2008 | Kinigakis et al. |
| 2008/0131035 A1 | 6/2008 | Rogers |
| 2008/0131636 A1 | 6/2008 | Kinigakis et al. |
| 2008/0132394 A1 | 6/2008 | Yeager |
| 2008/0134632 A1 | 6/2008 | Howell |
| 2008/0152264 A1 | 6/2008 | Pokusa et al. |
| 2008/0152850 A1 | 6/2008 | Paterson |

| | | | |
|---|---|---|---|
| 2008/0156861 A1 | 7/2008 | Sierra-Gomez et al. |
| 2008/0164288 A1 | 7/2008 | Singleton |
| 2008/0206417 A1 | 8/2008 | Kirsch et al. |
| 2008/0223007 A1 | 9/2008 | Friebe et al. |
| 2008/0240627 A1 | 10/2008 | Cole et al. |
| 2008/0240628 A1 | 10/2008 | VanLoocke et al. |
| 2008/0260305 A1 | 10/2008 | Shah et al. |
| 2008/0271415 A1 | 11/2008 | Owen et al. |
| 2008/0272585 A1 | 11/2008 | Conard et al. |
| 2009/0022433 A1 | 1/2009 | Goglio et al. |
| 2009/0022435 A1 | 1/2009 | Tanaka et al. |
| 2009/0028472 A1 | 1/2009 | Andersson et al. |
| 2009/0042706 A1 | 2/2009 | Howell et al. |
| 2009/0050254 A1 | 2/2009 | Goto et al. |
| 2009/0053372 A1 | 2/2009 | Hambrick et al. |
| 2009/0056278 A1 | 3/2009 | Anzini et al. |
| 2009/0080810 A9 | 3/2009 | Steele |
| 2009/0127281 A1 | 5/2009 | Hickey |
| 2009/0129707 A1 | 5/2009 | Howell |
| 2009/0136161 A1 | 5/2009 | Hickey |
| 2009/0142006 A1 | 6/2009 | Wine et al. |
| 2009/0145084 A1 | 6/2009 | Sampaio |
| 2009/0148081 A1 | 6/2009 | Rogers |
| 2009/0152139 A1 | 6/2009 | Roesink et al. |
| 2009/0190861 A1 | 7/2009 | Turvey et al. |
| 2009/0190862 A1 | 7/2009 | Barksdale et al. |
| 2009/0190867 A1 | 7/2009 | Goto et al. |
| 2009/0202183 A1 | 8/2009 | Hagino |
| 2009/0211938 A1 | 8/2009 | Aldridge |
| 2009/0221408 A1 | 9/2009 | Cope et al. |
| 2009/0226117 A1 | 9/2009 | Davis et al. |
| 2009/0238500 A1 | 9/2009 | Nanba et al. |
| 2009/0245699 A1 | 10/2009 | Steele |
| 2009/0255216 A1 | 10/2009 | Anzini et al. |
| 2009/0257686 A1 | 10/2009 | Anzini |
| 2009/0263049 A1 | 10/2009 | Iannelli, II et al. |
| 2009/0285772 A1 | 10/2009 | Anzini |

FOREIGN PATENT DOCUMENTS

| | | |
|---|---|---|
| EP | 0 905 048 A1 | 9/1997 |
| EP | 1254846 A1 | 11/2002 |
| EP | 1 449 789 A1 | 2/2003 |
| EP | 1714894 B1 | 10/2006 |
| EP | 1714907 A1 | 10/2006 |
| EP | 1 886 934 A2 | 8/2007 |
| EP | 1908696 A1 | 4/2008 |
| EP | 1930252 A1 | 6/2008 |
| GB | 2438393 A | 11/2007 |
| GB | 2441320 A | 3/2008 |
| GB | 2444113 A | 5/2008 |
| IT | 01319964 | 11/2003 |
| JP | 2006/224984 A | 8/2006 |
| JP | 2007/246137 A | 9/2007 |
| JP | 2008/230666 A | 2/2008 |
| WO | WO 96/40504 | 12/1996 |
| WO | WO 02/066341 | 2/2001 |
| WO | WO 03/059776 A1 | 12/2002 |
| WO | WO 2005/009851 A1 | 2/2005 |
| WO | WO 2005/123535 A1 | 5/2005 |
| WO | WO 2006/005848 A1 | 1/2006 |
| WO | WO 2007/057060 A1 | 5/2007 |
| WO | WO 2007/135451 A1 | 11/2007 |
| WO | WO 2008/001768 A1 | 1/2008 |
| WO | WO 2008/021335 A2 | 2/2008 |
| WO | WO 2008/029129 A2 | 3/2008 |
| WO | WO 2008/048661 A2 | 4/2008 |
| WO | WO 2008/051813 A1 | 5/2008 |

OTHER PUBLICATIONS

"Curwood Introduces Next-Generation Peel-Reseal Technology for Tray & Lid Systems", Nov. 5, 2008, 2 pages.
"Welcome to Sealstrip.com", 2005, 11 pages.
"Snack brand gets turned on its side", Packaging World, May 2008, pp. 18-19.
"Inno-Lok® pre-zippered film", Jun. 2005, 4 pages.
"Amcor E-close", on or about Apr. 2008 (document undated), 2 pages.
"New choices in flexible packaging: new material options for flexible packaging", Pira Acc. Num. 20294555, from Pharm.Med. Packag. News, vol. 14, No. 10, Oct. 2006, 1 page.
"Sealed Air add resealable applicator to line-up", Mar. 11, 2005, 1 page.
"Perfecting the Breakable Seal", Packaging Digest, Jun. 1990, 1 page.
"Horizontal Flow Wrappers", on or about Jan. 2009 (document undated), 2 pages.
"Vegatronic 2000", May 2005, 2 pages.
"Hurricane", on or about Jan. 2009 (document undated), 4 pages.
"New Opportunities in cheese packaging", from Dairy Foods, May 2007, 2 pages.
3 Sigma Corporation, color brochure, 21 pages, 2008.
Wausau Coated, Liners, color brochure, on or about Sep., 2006, (document undated), 4 pages.
Wausau Coated, Products for HP Indigo Digital Presses, color brochure, 4 pages, Jun., 2005.
Wausau Coated, Custom Sheets, color brochure, on or about Sep., 2006, (document undated), 4 pages.
Wausau Coated, Custom Retail Packaging, color brochure, on or about Sep., 2006, (document undated), 4 pages.
Wausau Coated, Innovation, color brochure, on or about Sep., 2006, (document undated), 4 pages.
Wausau Coated, Offering You the Perfect Blend of Products and Services, color brochure, on or about Sep., 2006, (document undated), 6 pages.

* cited by examiner

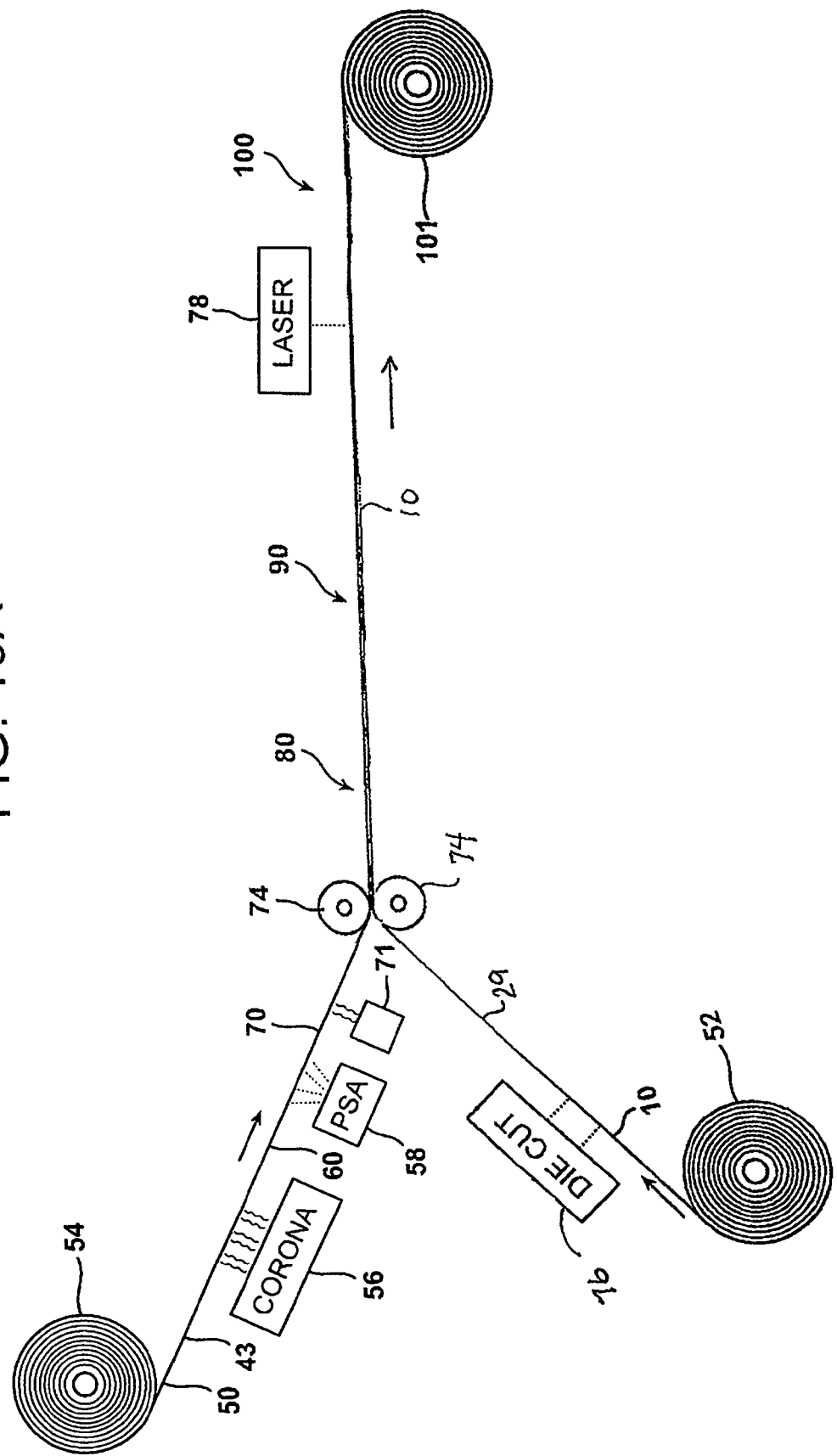

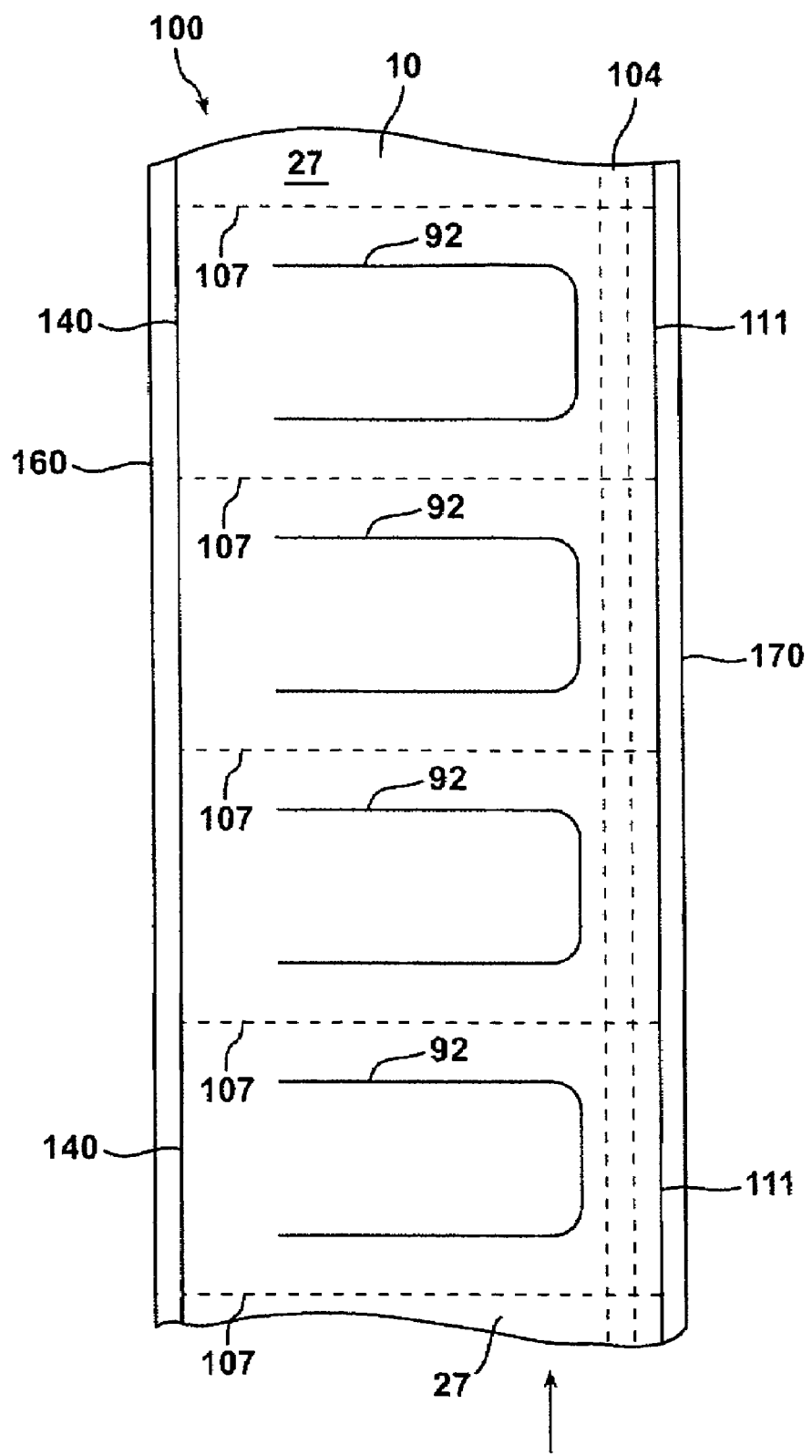

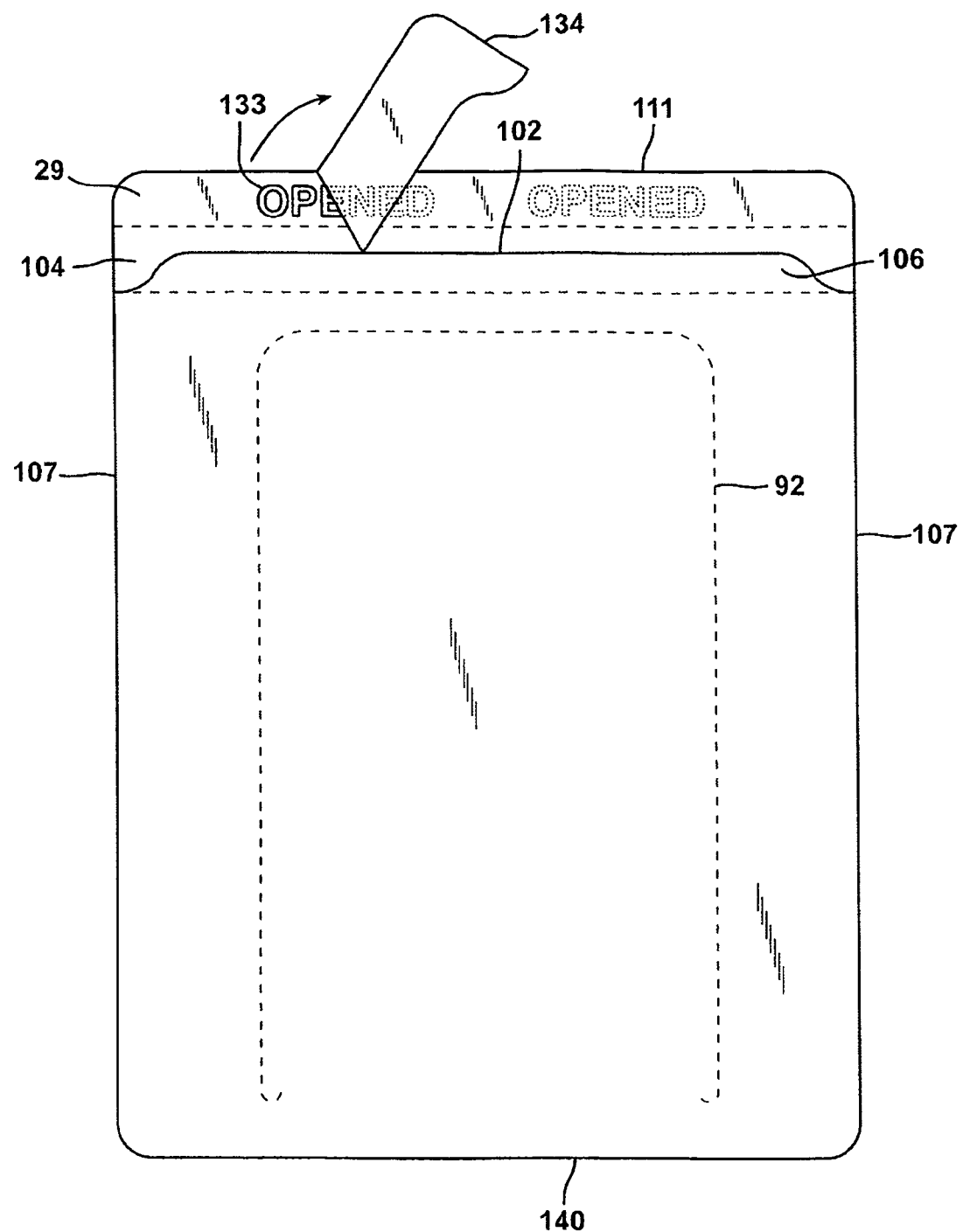

LAMINATED LIDSTOCK

This application claims the benefit of U.S. Provisional Application No. 61/010,790, filed Jan. 11, 2008, that application incorporated herein by reference in its entirety.

FIELD OF THE INVENTION

This invention relates to a laminated lidstock, to a method of making the laminated lidstock, and to a tamper evident reclosable package made using the laminated lidstock.

BACKGROUND OF THE INVENTION

Food products such as sliced luncheon meats, sliced cheeses and the like have long been packaged in trays having a lidstock cover. The trays can be pre-made trays made from various thermoplastic materials such as foamed polystyrene. Alternatively, trays can be formed from a web of thermoplastic material on the packaging machine at a food processing/packaging facility. The latter makes use of horizontal form/fill/seal equipment (such as thermoforming equipment) available from e.g. Multivac, for converting flat thermoplastic forming web into formed pockets to create trays for containing the food product. In either case, the food product is manually or automatically placed in the tray, a lidstock (also known as a non-forming web) is brought over the top of the filled tray, the filled tray is typically vacuumized or gas flushed, and the lidstock is hermetically sealed to the tray, e.g. by a perimeter heat seal on the tray flange, to finish the package. Opening of the finished package (i.e. opening with the use of tools such as scissors or knives) can provide access to the food product by the consumer. In some instances, a reclosable feature is included to permit the package to be easily reclosed, although typically not in a hermetic manner.

Food packagers often require on their packages, decorative or informational printed labels that carry their trademark or logo, the nature of the food product in the package, and other indicia. This in turn requires either the food packager, or the supplier of the lidstock material, to install discrete printed labels either on individual packages after they are made, or on the lidstock itself in some registered manner that avoids undesirably offset labels. Any of these processes is less than ideal, and adds cost to the production of the package.

There is need in the marketplace for a packaging arrangement whereby lidstock can be produced by a supplier of lidstock, that can be used in a manner that requires little or no modification to the food packager's packaging equipment, while providing both a manually (i.e. by hand, without the need for tools such as scissors or knives) openable and reclosable feature, tamper evidence, and hermeticity of the package when made.

There is need in the marketplace for a packaging arrangement whereby printed lidstock can be produced by a supplier of lidstock, without the use of discrete labels, and in a manner that requires little or no modification to the food packager's packaging equipment, while also providing both a manually openable/reclosable feature, tamper evidence, and hermeticity of the package when made.

There is also a need in the marketplace for a thermoformed, lidded package where the lidstock carries printed indicia, in the absence of a discrete printed label.

The present invention relates to hermetically sealed packages which are manually openable and reclosable and are adapted to package e.g. sliced food products such as sliced luncheon meat or cheese. The package includes a tamper-evidence device, is manually openable and reclosable, and maintains a hermetic seal until the package is opened, at which time reclosable access is gained to the contents of the package in a manner that informs a purchaser or user the package had been opened. The lidstock of the package is optionally printed with decorative or Informational print.

SUMMARY OF THE INVENTION

In a first aspect, a laminated lidstock comprises a substrate film comprising an outer laminating layer comprising a thermoplastic material, the outer laminating layer having an outer surface to which a support web can be adhered with a pressure sensitive adhesive; and an inner sealing layer comprising a thermoplastic material, the inner layer having a surface which can be sealed to a tray; a support web having an outer surface and an inner surface, comprising a thermoplastic material selected from polyester, polyamide, and polyolefin; a pressure sensitive adhesive disposed between the substrate film and the support web, and covering the outer surface of the outer laminating layer of the substrate film, and the inner surface of the support web except for a clear area disposed near, and spaced from, a first end of the laminated lidstock; a first die cut disposed in the substrate film, but not substantially present in the support web; a second die cut disposed in the support web, but not substantially present in the substrate film; a pull tab, spaced apart from a first end of a package made from the laminated lidstock, the pull tab comprising an intermediate portion of the support web, spaced from the first die cut, defined by the second die cut, a first side edge of a package made from the laminated lidstock, and a second side edge of a package made from the laminated lidstock; and a tamper evidence device disposed at one end of the laminated lidstock, the tamper evidence device comprising a first end portion of the support web, defined by a first end of a package made from the laminated lidstock, the first side edge of a package made from the laminated lidstock, the second side edge of a package made from the laminated lidstock, and the second die cut, the tamper evidence device capable of indicating tampering of the package upon removal of the first end portion of the support web from the substrate film; wherein at least one of the substrate film and the support web carries a registration device.

In a second aspect, a method of making a laminated lidstock comprises providing a substrate film comprising an outer laminating layer comprising a thermoplastic material, the outer laminating layer having an outer surface to which a support web can be adhered with a pressure sensitive adhesive, and an inner sealing layer comprising a thermoplastic material, the inner sealing layer having a surface which can be sealed to a tray; providing an support web, having an outer surface and an inner surface, comprising a thermoplastic material selected from polyester, polyamide, and polyolefin; applying a coating of pressure sensitive adhesive to substantially the entire inner surface of the support web; providing, in a selected portion of the inner surface of the support web, a clear area near and spaced apart from a first end of the support web; curing the coating of pressure sensitive adhesive; bringing the substrate film and the support web together such that the pressure sensitive adhesive is disposed between the substrate film and the support web, covers the outer surface of the substrate film and the inner surface of the support web except for the clear area disposed near and spaced apart from one end of the support web, and adheres the substrate film and the support web together; making a first die cut in the substrate film, but not substantially in the support web; and making a second die cut in the support web, but not substantially in the substrate film; such that a pull tab is provided, spaced apart from a first end of a package made from the laminated lidstock, the pull tab comprising an intermediate portion of the support web, spaced from the first die cut, defined by the second die cut, a first side edge of a package made from the laminated lidstock, and a second side edge of a package made from the laminated lidstock; and a tamper evidence device is provided at one end of the laminated lidstock, comprising a first end portion of the support web, defined by the first end of a package made from the laminated lidstock, the first side edge of a package made from the laminated lidstock, the second side edge of a package made from the laminated lidstock, and the second die cut, the tamper evidence device capable of indicating tampering of the package upon removal of the first end portion of the support web from the substrate film.

In a third aspect, a tamper evident reclosable package comprises a tray comprising a tray bottom, tray sides, and a tray flange, wherein the tray bottom and tray sides define a tray cavity; a food product disposed in the tray cavity; and a laminated lidstock, hermetically sealed to the tray flange, comprising a substrate film comprising an outer laminating layer comprising a thermoplastic material, the outer laminating layer having an outer surface to which a support web can be adhered with a pressure sensitive adhesive, and an inner sealing layer comprising a thermoplastic material, the inner sealing layer having a surface which can be sealed to the tray flange; a support web having an outer surface and an inner surface, comprising a thermoplastic material selected from polyester, polyamide, and polyolefin; a pressure sensitive adhesive disposed between the substrate film and the support web, and covering the outer surface of the outer laminating layer of the substrate film and the inner surface of the support web except for a clear area disposed near and spaced apart from a first end of the support web; a first die cut disposed in the substrate film, but not substantially present in the support web; a second die cut disposed in the support web, but not substantially present in the substrate film; a pull tab, spaced apart from a first end of the package, the pull tab comprising an intermediate portion of the support web, spaced from the first die cut, defined by the second die cut, a first side edge of the package, and a second side edge of the package; and a tamper evidence device disposed at one end of the laminated lidstock, the tamper evidence device comprising a first end portion of the support web, defined by the first end of the package, the first side edge of the package, the second side edge of the package, and the second die cut, the tamper evidence device capable of indicating tampering of the package upon removal of the first end portion of the support web from the substrate film; wherein the inner sealant layer of the substrate film is sealed to the tray flange.

BRIEF DESCRIPTION OF THE DRAWINGS

The present invention is illustrated by reference to the following drawings, encompassing different views of various embodiments of the invention, wherein:

FIG. 10A is a schematic flow chart showing an alternative method of making the printed laminate of FIG. 9;

FIG. 12 is a schematic bottom plan view of the printed laminate of FIG. 9;

FIG. 22 is a schematic top plan view of the laminated lidstock and package of FIG. 21, showing the first tamper evidence device in a partially removed condition;

DEFINITIONS

Figure 1:
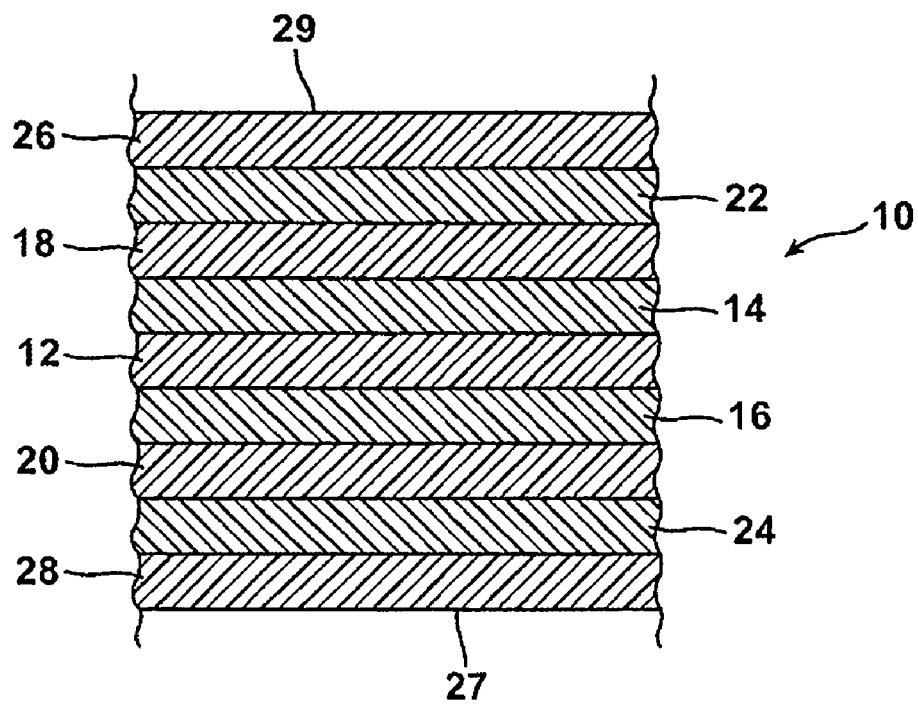
FIG. 1 is a schematic elevational view of a portion of a substrate film in accordance with an embodiment of the invention.

"Clear area" herein refers to a selected portion of the inner surface of the support web. The clear area 104 can be made by e.g. 1) initially avoiding the application of pressure sensitive adhesive to the surface area of the support web, or 2) applying the pressure sensitive adhesive relatively uniformly over the inner surface of the support web, followed by masking or deadening the pressure sensitive adhesive in the selected portion by any suitable means, before taking the step of bringing the substrate film, and the support web together, e.g. through nip rolls or other suitable means, such that the pressure sensitive adhesive is disposed between the substrate film and the support web, and adheres the substrate film and the support web together; or 3) applying the pressure sensitive adhesive relatively uniformly over the inner surface of the support web, followed by removing most or all of the pressure sensitive adhesive in the selected portion, e.g. by scraping the pressure sensitive adhesive off the support web by suitable means such as a shim or scraper. The masking or deadening agents referred to above effectively substantially reduce or nullify the adhesive effect of the pressure sensitive adhesive in the selected portion, compared with the adhesive effect of the pressure sensitive adhesive In portions of the support web adjacent to the selected portion. Deadening or masking of the pressure sensitive adhesive will typically be done after the pressure sensitive adhesive has been cured; removal of most or all of the pressure sensitive adhesive will typically be done before the pressure sensitive adhesive has been cured.

"Die cut" herein refers to conventional methods of cutting or scoring materials, including rotary die, steel rule die, and platen die cutting. For purposes of this application, "die cut" also includes in one embodiment laser cutting or scoring.

"Distorted" and the like herein means changed visually, e.g. changed in shape, or torn or partially torn.

"Film" is used herein to mean films, laminates, and webs, either multilayer or monolayer, that may be used in connection with the present invention.

"Ethylene/alpha-olefin copolymer" (EAO) herein refers to copolymers of ethylene with one or more comonomers selected from $C_3$ to $C_{10}$ alpha-olefins such as propene, butene-1, hexene-1, octene-1, etc. in which the molecules of the copolymers comprise long polymer chains with relatively few side chain branches arising from the alpha-olefin which was reacted with ethylene. EAO includes such heterogeneous materials as linear medium density polyethylene (LMDPE), linear low density polyethylene (LLDPE), and very low and ultra low density polyethylene (VLDPE and ULDPE), such as DOWLEX™ and ATTANE™ resins supplied by Dow, and ESCORENE™ resins supplied by Exxon; as well as linear homogeneous ethylene/alpha olefin copolymers (HEAO) such as TAFMER™ resins supplied by Mitsui Petrochemical Corporation, EXACT™ and EXCEED™ resins supplied by Exxon, long chain branched (HEAO) AFFINITY™ resins and ELITE™ resins supplied by the Dow Chemical Company, ENGAGE™ resins supplied by DuPont Dow Elastomers, and SURPASS™ resins supplied by Nova Chemicals. "EAO" also includes multicomponent ethylene/alpha-olefin interpenetrating network resin (or "IPN resin").

"Ethylene homopolymer or copolymer" herein refers to ethylene homopolymer such as low density polyethylene (LDPE), medium density polyethylene (MDPE), high density polyethylene (HDPE); ethylene/alpha olefin copolymer such as those defined herein; ethylene/vinyl acetate copolymer; ethylene/alkyl acrylate copolymer; ethylene/(meth)acrylic acid copolymer; or ionomer resin.

"Lidstock" herein refers to a film, made at least in part from a thermoplastic multi-layer material, that is used to cover a container or tray that carries a product, such as a food product, such as luncheon meat, cheese, or produce. It can be sealed to the tray, typically as a perimeter heat seal. Lidstock typically is supplied to a food processor in a lay flat film rolled onto a roll.

"Matrix" herein refers to a portion of the support web that can be removed from the laminated lidstock after the second die cut is made. The matrix when removed is a strip of support web. The matrix in one embodiment (see FIG. 11) is one continuous strip of material. In another embodiment (see FIG. 11A) the matrix is in two parts. Either or both of these parts can in various embodiments be removed to function as the tamper evidence device.

"Olefinic" and the like herein refers to a polymer or copolymer derived at least in part from an olefinic monomer.

"Oxygen barrier" and the like herein refers to materials having an oxygen permeability, of the barrier material, less than 500 $cm^3$ $O_2/m^2 \cdot day \cdot atmosphere$ (tested at 1 mil thick and at 25° C., 0% RH according to ASTM D3985), such as less than 100, less than 50, less than 25, less than 10, less than 5, and less than 1 $cm^3$ $O_2/m^2 \cdot day \cdot atmosphere$. Examples of polymeric materials useful as oxygen barrier materials are ethylene/vinyl alcohol copolymer (EVOH), polyvinylidene dichloride (PVDC), vinylidene chloride/methyl acrylate copolymer, vinylidene chloride/vinyl chloride copolymer, polyamide, and polyester. Examples of polymeric materials having an oxygen permeability, of the barrier material, less than 50 $cm^3$ $O_2/m^2 \cdot day \cdot atmosphere$ are ethylene/vinyl alcohol copolymer (EVOH), polyvinylidene dichloride (PVDC), vinylidene chloride/methyl acrylate copolymer, and vinylidene chloride/vinyl chloride copolymer. The exact oxygen permeability optimally required for a given application can readily be determined through experimentation by one skilled in the art.

"Polyamide" herein refers to polymers having amide linkages along the molecular chain, and preferably to synthetic polyamides such as nylons.

"Polymer" and the like herein means a homopolymer, but also copolymers thereof, including bispolymers, terpolymers, etc.

"Pressure sensitive adhesive" (PSA) herein refers to an adhesive that bonds firmly with the application of light pressure. It adheres to most surfaces with very slight pressure; are available in solvent and latex or water based forms, and is often based on non-crosslinked rubber adhesives, acrylics, or polyurethanes. PSA forms viscoelastic bonds that are aggressively and permanently tacky; adhere without the need for more than hand pressure; and require no activation by water, solvent, or heat. Some PSA materials are cured by hot air, electron beam, UV, or chemical (peroxide) means. They are available in a wide variety of chemical compositions and systems including acrylic and methacrylate adhesives, rubber-based pressure sensitive adhesives, styrene copolymers (styrene/isoprene/styrene and styrene/butadiene/styrene block copolymers), and silicones. In some embodiments, hot melt adhesives may be useful as well, are included herein for those embodiments as "PSA"; a hot melt adhesive is a thermoplastic adhesive compound, usually solid at room temperature which becomes fluid on heating for use.

"Registration device" herein refers to any mark, pattern, or feature of a film or web, that facilitates the advancement of the film or web, in a controlled manner, into a packaging machine, where the film or web is used as lidstock to make individual packages. The device can be printed in uniformally spaced fashion along or near an edge of the laminated lidstock, i.e. registration marks. Alternatively, in connection with appropriate sensors, the device can be the leading or trailing edge of decorative print, or a die cut, associated with films or webs of the present invention.

"Score", "scoring" or the like herein refers to a type of die cut that does not extend entirely through the relevant layer or film, made e.g. by a laser. Thus, a score by definition leaves intact a certain amount of material in the area of this type of die cut.

"Tamper evidence", "tampering", and the like herein refers to a breach in a package; i.e. that someone has accidentally or intentionally opened or partially opened the package, or has attempted to do so; and visual evidence that such a breach has occurred.

"Tray" herein refers to a formed member that has a tray bottom, tray sides, and a tray flange around the upper perimeter of the tray, where the tray bottom and tray sides form an internal cavity or space within which a product such as sliced luncheon meat can be placed, which cavity can be enclosed by a lidstock material sealed to the tray flange. A "filled" tray is one which contains the product, not necessarily one where the entire space inside the cavity is completely taken up with the food product.

All compositional percentages used herein are presented on a "by weight" basis, unless designated otherwise.

DETAILED DESCRIPTION OF THE INVENTION

Examples

1. Material

The lidstock laminate for use in accordance with the invention includes (a) a substrate film, and (b) a printed support web. Resins for these films are identified in Table 1.

TABLE 1

| Material Code | Tradename Or Designation | Source(s) |
|---|---|---|
| AD1 | PX3236 ™ | Equistar |
| NY1 | AEGIS ™ H100QP | Honeywell |
| NY2 | GRIVORY ™ G21 | EMS |
| NY3 | ULTRAMID ™ B33LN 01 | BASF |
| OB1 | SOARNOL ™ ET3803 | Nippon Gohsei |
| OB2 | EVAL ™ H171B | EVALCA/Kuraray |
| PE1 | EXCEED ™ 4518P | ExxonMobil |
| PE2 | EXACT ™ 3024 | ExxonMobil |
| SL1 | FSU 255E ™ | A. Schulman |
| SL2 | GRILON ™ MB 3361 FS Natural | EMS |
| SL3 | 1080864S ™ | Clariant |

AD1 is a maleic anhydride grafted linear low density polyethylene that acts as a polymeric adhesive (tie layer material). It has a melt flow rate of 2.0 grams/10 minutes at 190° C./02.16 kg (Condition E), and a density of 0.922 grams/cc.

NY1 is nylon 6 (polycaprolactam).

NY2 is an amorphous copolyamide (6I/6T) derived from hexamethylene diamine, isophthalic acid, and terephthalic acid.

NY3 is nylon 6 (polycaprolactam).

OB1 is an ethylene/vinyl alcohol copolymer (EVOH) with about 38 mole % ethylene.

OB2 is an ethylene/vinyl alcohol copolymer with about 38 mole % ethylene.

PE1 is a single site catalyzed ethylene/hexene copolymer with a density of 0.918 grams/cc, and a melt flow rate of 4.5 grams/10 minutes at 190° C./02.16 kg (Condition E).

PE2 is a single site catalyzed ethylene/1-butene copolymer with a density of 0.905 grams/cc, and a melt flow rate of 4.5 grams/10 minutes at 190° C./02.16 kg (Condition E).

SL1 is a masterbatch having about 70% low density polyethylene with 25% silica and 5% erucamide, each component by with of the masterbatch. A very small amount of stabilizer is present.

SL2 is a polyamide 6 based masterbatch containing antiblock and slip materials.

SL3 is a masterbatch having about 70% polyamide 6, 20% diatomaceous earth and 10% erucamide, each component by weight of the masterbatch.

All compositional percentages herein are by weight, unless indicated otherwise.

A. Substrate Film

A representative film structure suitable for use as the substrate film 10 in accordance with the invention is shown in FIG. 1.

In one embodiment, this film has the composition shown in Table 2.

TABLE 2

(Example 1)

| Layer | Composition | Gauge (vol. %) | Gauge (mils) | Gauge (μm) |
|---|---|---|---|---|
| 26 | 96% NY3 + 2% SL2 + 2% SL3 | 13.0 | 0.33 | 8.3 |
| 22 | AD1 | 18.0 | 0.45 | 11.4 |
| 18 | AD1 | 5.0 | 0.13 | 3.2 |
| 14 | 80% NY1 + 20% NY2 | 6.5 | 0.16 | 4.1 |
| 12 | OB1 | 8.0 | 0.20 | 5.1 |
| 16 | 80% NY1 + 20% NY2 | 6.5 | 0.16 | 4.1 |
| 20 | AD1 | 8.0 | 0.20 | 5.1 |
| 24 | PE1 | 20 | 0.50 | 12.7 |
| 28 | 94% PE2 + 6% SL1 | 15 | 0.38 | 9.5 |

Example 1 as shown has a total thickness of about 2.5 mils.

Core layer 12 of the above film structure can comprise any suitable oxygen barrier material, such as EVOH, and can be blended in any suitable proportion with other polymeric materials or organic or inorganic additives as desired.

In one embodiment, intermediate layers 14 and 16 can each comprise 100% semicrystalline polyamide such as nylon 6.

In another embodiment, Intermediate layers 14 and 16 each comprise a blend of an amorphous polyamide and a semicrystalline polyamide. The semicrystalline polyamide can be any suitable polyamide, including nylon 6.

The amorphous polyamide can comprise any suitable percent of the overall polyamide blend, and can comprise e.g. less than 50 wt. %, such as less than 40 wt %, and less than 30 wt. % of the polyamide blend of layers 14 and 16. The amorphous polyamide can comprise from 5 to 45 wt. %, such as from 20 to 40 wt. %, such as from 25 to 35 wt. % of the polyamide blend of layers 14 and 16. The blend ratios of layers 14 and 16 can be the same, or can differ.

Useful commercially available amorphous polyamides include FE4494™ and FE4495™. These are PA6I/66/69 polyamides available from EMS. Also useful is FE7103™, a PA6I/MXDI polyamide available from EMS. Other amorphous polyamides that can be used are PA66/6T; PA66/6I; PA66I/66T; PA6/6T; and PA6/6I. Also useful is PA6/3/T available from Degussa as TROGAMID™, and PA6I/6T available from DuPont as SELAR™ PA 3426.

The semicrystalline polyamide can comprise any suitable percent of the overall polyamide blend, and can comprise e.g. more than 50 wt. %, such as more than 60 wt. %, and more than 70 wt. % of the polyamide blend of layers 14 and 16. The semicrystalline polyamide can comprise from 55 to 95 wt. %, such as from 60 to 80 wt. %, such as from 65 to 75 wt. % of the polyamide blend of layers 14 and 16.

Tie layers 18 and 20 can comprise any suitable polymeric adhesive that functions to bond two layers together. Materials that can be used in embodiments of the present invention include e.g. ethylene/vinyl acetate copolymer; anhydride grafted ethylene/vinyl acetate copolymer; anhydride grafted ethylene/alpha olefin copolymer; anhydride grafted polypropylene; anhydride grafted low density polyethylene; ethylene/methyl acrylate copolymer; and anhydride grafted ethylene/methyl acrylate copolymer. Tie layers 18 and 20 can be the same, or can differ. The choice of tie layers depends at least in part on the choice of polymer for the other layers of the film.

Bulk layers 22 and 24 can comprises a suitable polyolefin, such as an ethylene/alpha-olefin copolymer; and/or a polymeric adhesive such as those disclosed herein for tie layers 18 and 20. Bulk layers 22 and 24 can be the same, or can differ.

Outer layer 26 functions as an outer laminating layer of the film, and provide a surface 29 to which the printed support web 50 (see FIG. 4) can be laminated by means of a pressure sensitive adhesive (PSA). This layer can comprise one or more of polyamide, polyester, any of various polyolefin copolymers including ethylene polymer or copolymer, ethylene/alpha olefin copolymer, ethylene/vinyl acetate copolymer, ionomer resin, ethylene/acrylic or methacrylic acid copolymer, ethylene/acrylate or methacrylate copolymer, low density polyethylene, high density polyethylene, propylene homopolymer, propylene/ethylene copolymer, or blends of any of these materials. Alternatively, a UV-cured or curable overprint varnish on e.g. an olefinic base can function as surface 29 of outer layer 26.

Inner layer 28 functions as a sealant layer of the film, and provide a surface 27 to which a product support such as a tray can be sealed, e.g. by heat sealing. Layer 28 comprises one or more olefinic polymers. Polymers that may be used for the inner layer include various polyolefin copolymers including ethylene polymer or copolymer, ethylene/alpha olefin copolymer, ethylene/vinyl acetate copolymer, ionomer resin, ethylene/acrylic or methacrylic acid copolymer, ethylene/acrylate or methacrylate copolymer, low density polyethylene, high density polyethylene, propylene homopolymer, propylene/ethylene copolymer, or blends of any of these materials.

Additional materials that can optionally be incorporated into one or more of the film layers, as appropriate, include antiblock agents, slip agents, antifog agents, fillers, pigments, dyestuffs, antioxidants, stabilizers, processing aids, plasticizers, fire retardants, UV absorbers, etc.

In general, the substrate film 10 can have any total thickness desired, and each layer can have any thickness desired, so long as the film provides the desired properties for the particular packaging application in which the film is used. Typical total film thicknesses are from 0.5 mils to 15 mils, such as 1 mil to 12 mils, such as 2 mils to 10 mils, 3 mils to 8 mils, and 4 mils to 6 mils. Suitable gauges include 2.5 mils (as in Example 1); 3.0, 3.5, 4.0, 4.5, 5.0, 6.0, 7.0, 8.0, and 9.0 mils. In one embodiment, layer gauges can be proportionately the same as shown in Example 1. By way of example, a substrate film 10 with a total thickness of 5.0 mils can have a layer 26 with a thickness of 0.76 mils, a layer 22 with a thickness of 1.0 mils, etc.

Alternatively, the various layers can have any suitable thickness.

Figure 2:
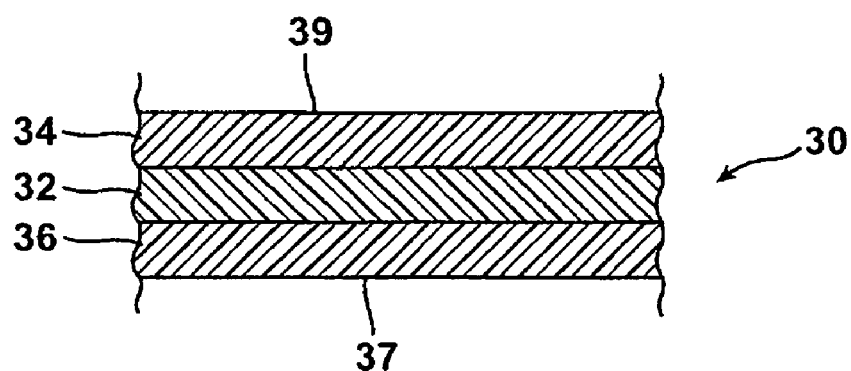
FIG. 2 is a schematic elevational view of a portion of a substrate film in accordance with an alternative embodiment of the invention.

Substrate film 10 can have any suitable number of layers, as long as a sealant layer is present, to provide a layer sealable to a product support member; and an outer layer is present that functions as a surface to which the printed support web 50 (see FIG. 4) can be laminated by means of a pressure sensitive adhesive (PSA). Thus, by way of example, FIG. 2 shows, in another embodiment, a three layer film 30 having an oxygen barrier layer 32 sandwiched between an outer layer 34, that can function as a laminating layer by providing a surface 39 to which the printed support web 50 (see FIG. 4) can be laminated by means of a pressure sensitive adhesive (PSA), and a sealant layer 36 that provides a surface 37 to which a product support member such as a tray can be sealed, e.g. by heat sealing. Two, three, four, five, six, seven, and eight layer films can alternatively be produced, that each include the essential layers described above with respect to the film of FIG. 2, with additional layers as needed, using suitable polymers such as olefin homopolymers or copolymers.

In another embodiment (see FIG. 2A), the oxygen barrier layer of substrate film 10 is not necessary, provided that the support web (discussed in more detail below) includes a coating or layer that comprises an oxygen barrier having an oxygen permeability, of the barrier material, less than 50 cm$^3$ O$_2$/m$^2$·day·atmosphere (tested at 1 mil thick and at 25° C., 0% RH according to ASTM D3985), e.g. EVOH or saran.

Figure 2A:
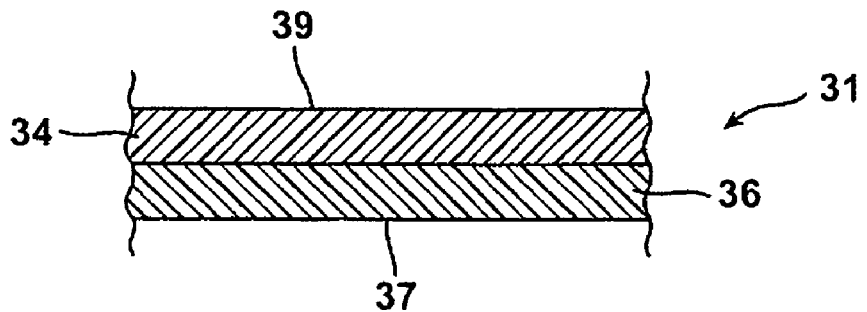
FIG. 2A is a schematic elevational view of a portion of a substrate film in accordance with another embodiment of the invention.

In yet another alternative embodiment, a substrate film 31 as shown in FIG. 2A can be used in combination with a support web that does not have an oxygen barrier having an oxygen permeability, of the barrier material, less than 50 cc/m$^2$/24 hr at 25° C., 0% RH, 1 atm oxygen at a thickness of 1 mil (ASTM D 3985). Such applications include for example laminated lidstocks where a high oxygen barrier is not desirable, e.g. in packaging produce.

Thus, in various embodiments of the invention, both the substrate film and support web can include an oxygen barrier material, as a layer or coating, having an oxygen permeability, of the barrier material, less than 50 cc/m$^2$/24 hr at 25° C., 0% RH, 1 atm oxygen at a thickness of 1 mil (ASTM D 3985), such as EVOH or saran; alternatively, only one of the substrate film and support web can include such an oxygen barrier; and for some applications, like the packaging of produce, neither of the substrate film and support web include such an oxygen barrier.

B. Support web

Figure 3:
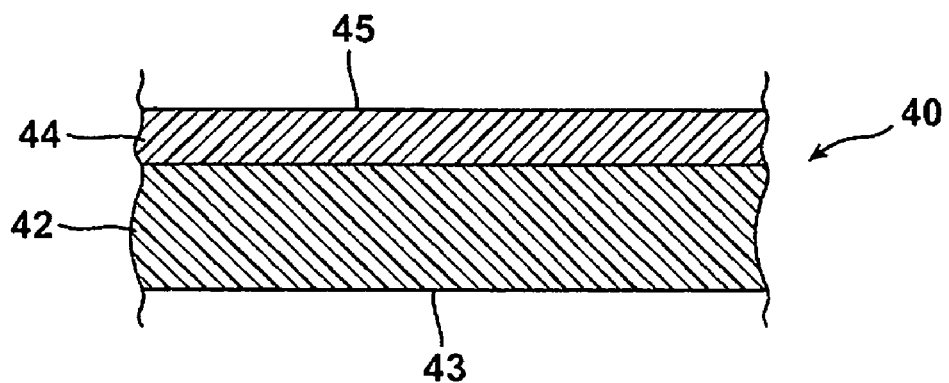
FIG. 3 is a schematic elevational view of a portion of a support web for use in connection with the invention.

Referring to FIG. 3, in one embodiment, a support web 40 is provided by applying a saran (polyvinylidene chloride (PVDC), vinylidene chloride/methyl acrylate copolymer, or vinylidene chloride/vinyl chloride copolymer) coating 44 to a support layer 42 such as polyester such as biaxially oriented PET (BOPET), polyamide such as biaxially oriented polyamide (BOPA), or polyolefin such as biaxially oriented polypropylene (BOPP). These materials are typically prepared by vendors and supplied to film converters. A commercial example of such film is MYLAR™ 34 from DuPont. This film is a monolayer PET film coated on one surface with saran.

In embodiments where a saran or other oxygen barrier is used In the support web, it is advantageous to apply the saran to the outer surface 45 of the support web 40, rather than the inner surface 43 of the support web 40. This is so that when the first die cut (discussed in more detail below) is made, the oxygen barrier properties of the overall laminated lidstock will not be compromised if the first die cut extends not only through the substrate film 10, but also into or through the saran coating of the support web 40.

In another embodiment, the oxygen barrier layer of support web 40 is not necessary provided the substrate film includes a coating or layer that comprises an oxygen barrier having an oxygen permeability, of the barrier material, less than 50 $cc/m^2/24$ hr at 25° C., 0% RH, 1 atm oxygen at a thickness of 1 mil (ASTM D 3985), e.g. EVOH or saran.

As indicated above, in another embodiment, neither the support web nor the substrate film have an oxygen barrier as described.

2. Method of Making a Laminated Lidstock

Figure 9:
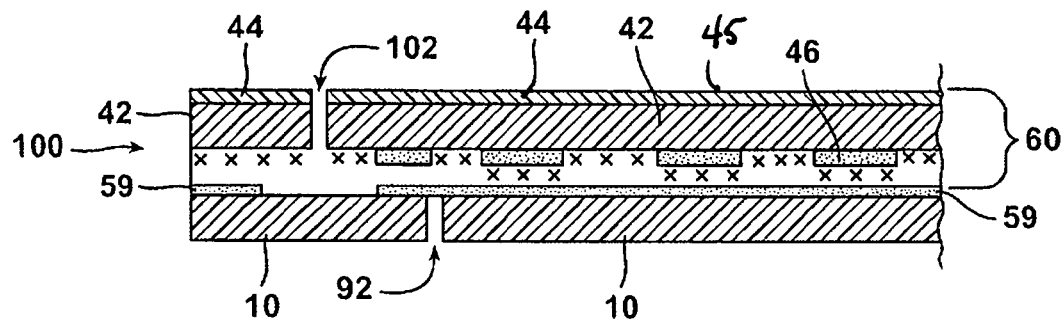
FIG. 9 is a schematic elevational view of the printed laminate of FIG. 8, with a die cut pattern substantially extending through the support web portion of FIG. 8.
Figure 10:
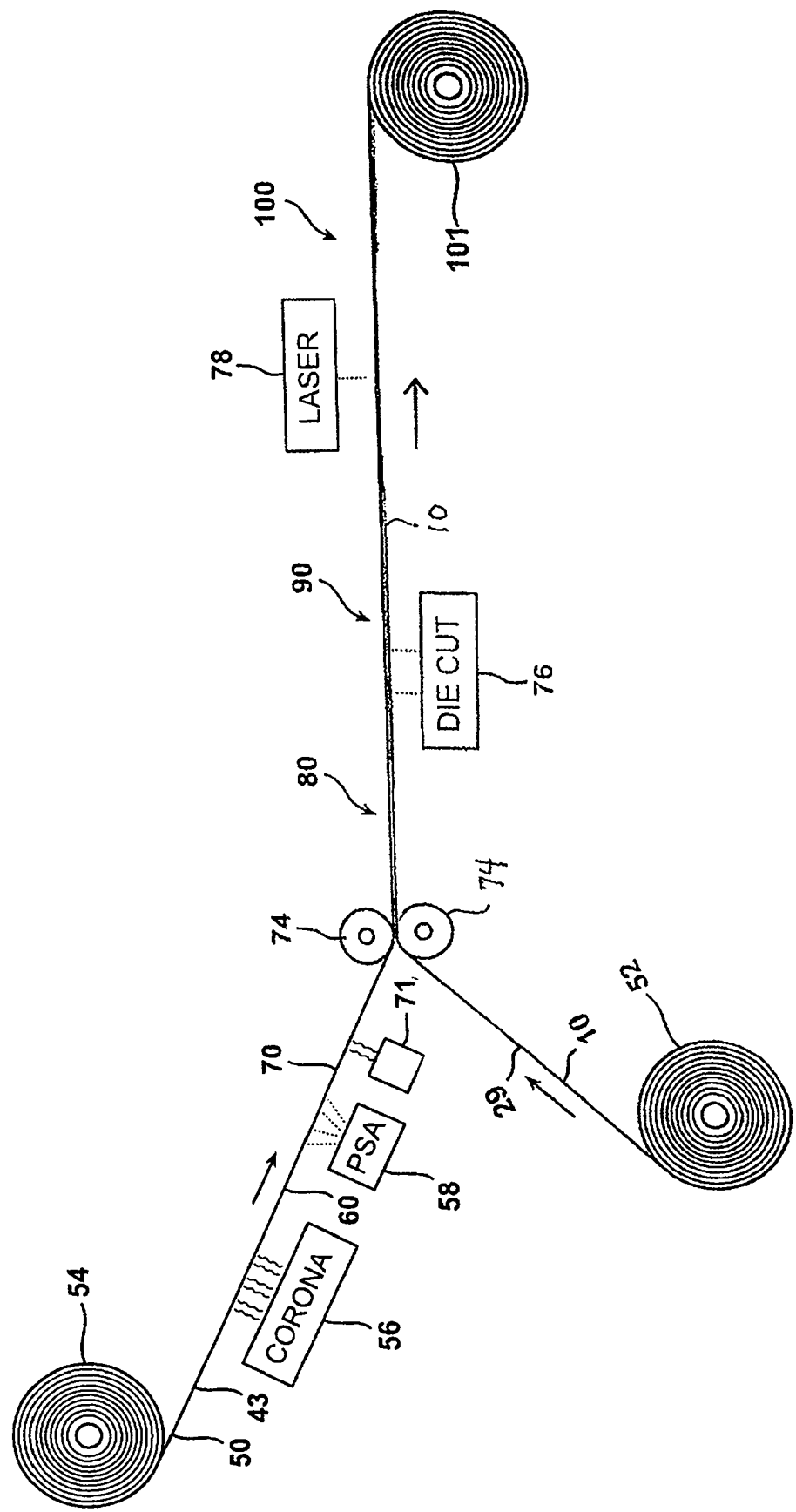
FIG. 10 is a schematic flow chart showing a method of making the printed laminate of FIG. 9.

With reference to FIG. 10, a method of making a laminated lidstock is shown. The flow of materials is in the direction of the arrows. Those of skill in the art will recognize that the drawings herein, including FIGS. 1 to 9, are not necessarily to scale, and certain features of the invention may be graphically exaggerated for clarity. The method comprises in one embodiment the following steps:

1) providing a substrate film 10 comprising an outer laminating layer comprising a thermoplastic material, the outer laminating layer having an outer surface to which a support web can be adhered with a pressure sensitive adhesive; and an inner sealant layer comprising a thermoplastic material, the inner sealant layer having an inner surface which can be sealed to a tray. The composition of the substrate film is in one embodiment as described herein, and as shown in FIG. 1. An alternative substrate film is shown in FIG. 2. The substrate film can be made by any suitable process, including coextrusion, extrusion coating, extrusion lamination, and conventional lamination using polyurethane or other adhesives. These manufacturing processes are well known in the art. Extrusion can be done in annular or flat dies. The extrudate can be hot blown or cast, and optionally solid-state oriented as desired. Chemical or electronic crosslinking of one or more layers of the webs can be done. As shown in FIG. 10, substrate film 10 is advanced by suitable motive means (not shown, and well known in the art, such as a motor) from roll 52.

2) providing a support web 40, having an outer surface and an inner surface, comprising a thermoplastic material selected from polyester such as biaxially oriented polyethylene terephthalate, polyamide such as biaxially oriented polyamide, and polyolefin such as biaxially oriented polypropylene. The composition of the support web is in one embodiment as described herein, and as shown in FIG. 3. The support web can be made by any suitable process. Optionally, a saran or other oxygen barrier material 44 is applied as e.g. a coat onto a surface of support layer 42.

Figure 4:
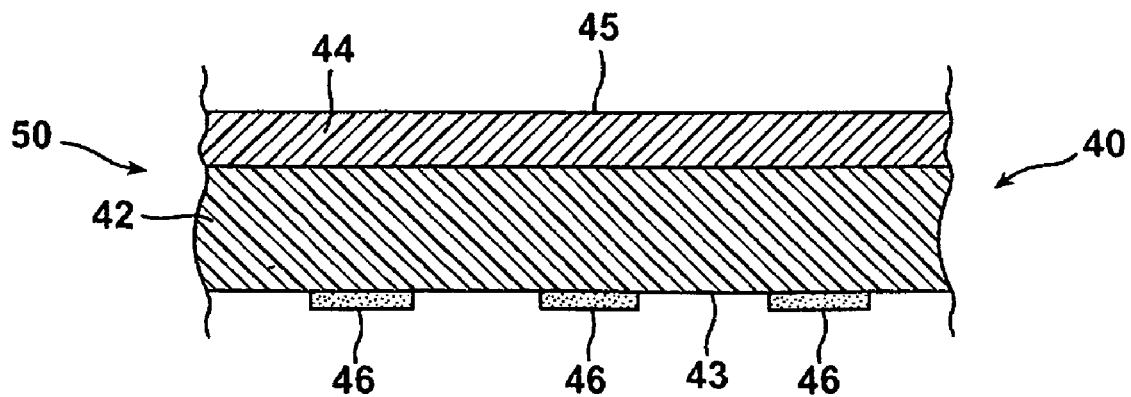
FIG. 4 is a schematic elevational view of the support web of FIG. 3, but also including an optional reverse print feature on a first surface of the support web.

3) Optionally, printing indicia on at least one of a) the outer surface 29 of the outer laminating layer 26 of the substrate film 10, and b) the inner surface 43 of the support layer 42 of the support web 40. With reference to FIGS. 4 and 10, support web 50 is shown as the support web 40 of FIG. 3, but with printed indicia 46 on one surface of the film. As shown in FIG. 10, support web 50 is advanced by suitable motive means (not shown, and well known in the art, such as a motor) from roll 54. The printed indicia can be of any suitable type or pattern, or ink composition, such as the types disclosed herein. Any suitable printing technique can be used, such as rotary screen, gravure, or flexographic techniques. Inks and processes for printing on plastic films are known to those of skill in the art. See, for example, Leach & Pierce, The Printing Ink Manual, (5th ed., Kluwer Academic Publishers, 1993), which is incorporated herein in its entirety by reference. In the art of flexographic printing, and in particular the use of an impression cylinder, a web passes between a printing cylinder and an impression cylinder. The impression cylinder is typically a smooth metal cylinder, and it supports the web against the printing cylinder. The printing cylinder is also typically a smooth metal cylinder, and carries one or more rubber or elastomeric printing plates. These plates pick up rapid drying fluid ink from an anilox (ink metering) roll, and deposit it on surface of the web in contact with the printing cylinder. The anilox roll in turn transfers ink from a fountain roll, or an open or closed doctor blade system, in communication with a source of ink. Flexographic techniques are discussed in Flexography Principles and Practices, second edition, copyright 1970, published by the Flexographic Technical Association, Inc.; and Flexographic Printing, copyright 1958, published by F. E. Boughton. The film to be printed is often corona treated before printing. This is conventional practice, and is not to be confused with the corona treatment disclosed herein in association with the application of pressure sensitive adhesive in accordance with the invention.

The printed indicia can be disposed on either a) the outer surface (29 or 39) of the outer laminating layer (26 or 34) of the substrate film, b) the inner surface (43, see FIG. 3) of the support web 42 of the support web 40, or c) both. Those of skill in the art will make such a choice based e.g. on the economics of each approach, and technically on the ability to produce a satisfactory printed surface on the materials chosen for layers 26 (FIG. 1) or 34 (FIG. 2) on the one hand, and 42 (FIG. 3) on the other hand, keeping in mind the effects of film movement and advancement during the processing of these films in accordance with the invention, and the possible effect on a printed surface.

PET, with a melting point of about 260° C., and a relatively high Young's modulus of between about 600,000 and 900,000 psi, is useful as a material to be coated with a pressure sensitive adhesive (particularly where a hot drying technique is used for curing the adhesive) and for printing with a registered print pattern. Other high modulus materials, e.g. with a Young's modulus of between about 600,000 and 900,000 psi can alternatively be used. Thus, FIGS. 4 and 10 are shown with the printed indicia 46 as a reverse print on the inner surface (43, see FIG. 4) of the support layer 42 of the support web 50. As shown in FIG. 10, support web 50 is advanced by suitable motive means (not shown, and well known in the art, such as a motor) from roll 54. The support web 40 could be printed in-line along with the remaining steps disclosed herein. Alternatively, and as shown in FIG. 10, support web 40 has been pre-printed to produce a printed support web 50.

In any of these embodiments, the printed indicia 46 are ultimately disposed between the substrate film and the support web in a trapped fashion, so that the printed indicia is not exposed to an exterior surface of the ultimate package. Nevertheless, additional printed indicia or labels could be added to the exterior of the finished package, and/or additionally printed on the outer surface 45 of coating or layer 44 of the support web (see FIGS. 3 and 4) if so desired, without departing from the invention.

The printed indicia can be decorative or informational in nature, supplying the same kinds of information, or the same decorative graphics, as currently supplied by conventional discrete labels. Decorative printed indicia can include a logo, a trademark, product information, etc. with text and/or graphics. Decorative and informational printed indicia are optional to the present invention.

Printed indicia can be in the form of registration marks. These are printed in uniformally spaced fashion along or near an edge of the laminated lidstock. These can be printed either as a surface print on the outer surface 29 or 39 of the substrate film 10 or 30; on the inner surface of support web 40; or on one of the outside surfaces of laminated lidstock 100. Registration marks facilitate the use of the laminated lidstock in thermoform packaging systems.

Printed indicia can be in the form of a message 133 (e.g. "opened"; see e.g. FIGS. 21 to 24) that comprises part of the tamper evidence device of one embodiment of the invention. This can be printed in scattered process (i.e. registration is not required) on or near the first edge of the substrate film 10. The message is surface printed on outer surface 29. In this embodiment, the support web is either surface printed at outer surface 45, or reverse printed at inner surface 43, with a flood ink coat, or other ink pattern that will hide the printed message until the matrix of the tamper evidence device is manually or otherwise pulled from the support web.

Figure 5:
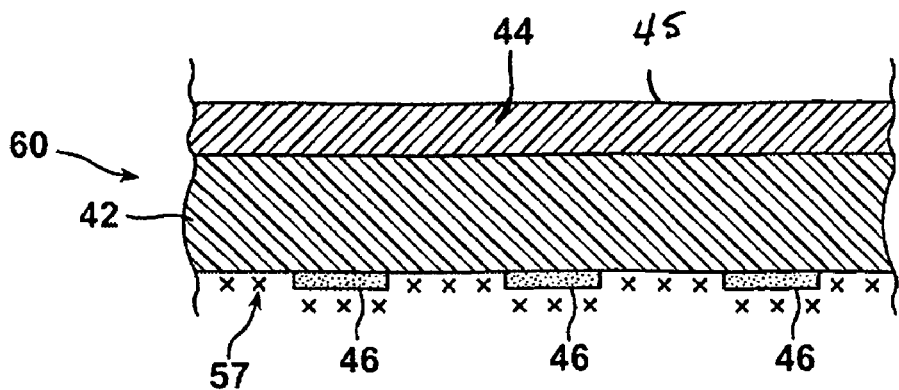
FIG. 5 is a schematic elevational view of the printed support web of FIG. 4, but also including a corona treated surface on the printed first surface of the support web.
Figure 6:
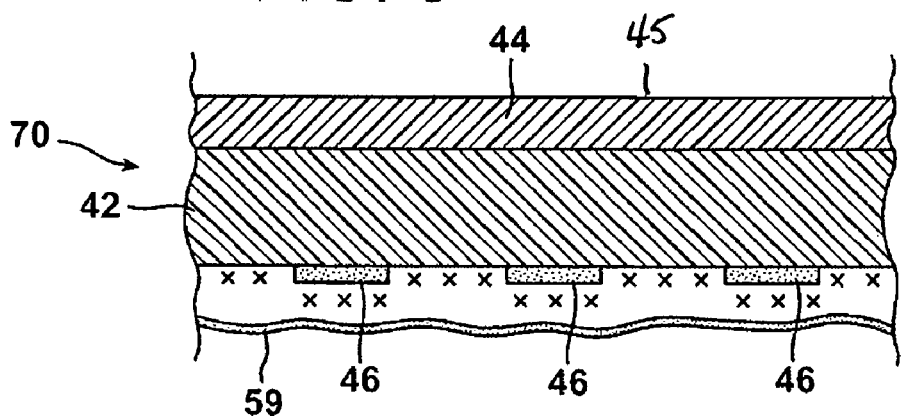
FIG. 6 is a schematic elevational view of the corona treated, printed support web of FIG. 5, but also including a coating of a pressure sensitive adhesive on the corona treated, printed first surface of the support web.
Figure 7:
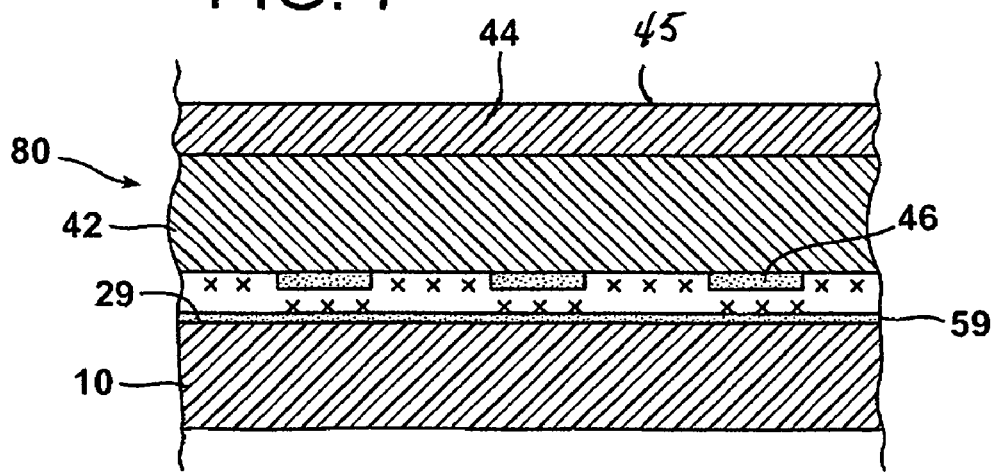
FIG. 7 is a schematic elevational view of a portion of a printed laminate resulting from the adhesion of the substrate film of FIG. 1 to the corona treated, printed support web of FIG. 6.

4) Optionally, corona treating the inner surface of the support web. A conventional corona treater 56 is shown in FIG. 10 as treating the inner surface (43, see FIG. 4) of the support layer 42 of the support web 50, to produce a support web 60 that is now both reverse printed, and has a corona treated surface 57 (see FIG. 5), in preparation for the application of a pressure sensitive adhesive to the treated surface. Typical PSA materials adhere well to PET. Also, PET has relatively high surface energy, so that relatively lower levels of corona treating as used herein is needed. In one embodiment, therefore, the inner surface 43 of a PET support web is corona treated and thereafter coated with a pressure sensitive adhesive. Thus, FIGS. 5 and 10 are shown with the corona treated surface 57 as the inner surface (43, see FIG. 4) of the support layer 42 of the support web 60.

The nature of the substrate film described in Example 1 is such, with respect to its adhesiveness to pressure sensitive adhesive, that in one embodiment the inner surface 43 of the support web is corona treated and then coated with a pressure sensitive adhesive.

Those of skill in the art will recognize, after a review of this disclosure, that as an alternative to corona treating the inner surface of the support web (in preparation for applying a pressure sensitive adhesive to the corona treated surface), a silicon-coated transfer paper can be coated with a pressure sensitive adhesive, and then the pressure sensitive adhesive can be transferred to the outer laminating layer (26 or 34) of the substrate film.

The pressure sensitive adhesive will typically adhere to the support web and the substrate film without corona treatment. However, in this embodiment, depending on the materials chosen for each, the pressure sensitive adhesive may, upon opening of a package in accordance with the invention, exhibit alternating adhesive failure, i.e. some of the pressure sensitive adhesive may adhere to the support web, and some may adhere to the substrate film. Depending upon the commercial end-use application and style of package, having an appreciable amount of pressure sensitive adhesive left on the substrate film, upon opening of the package, may or may not be acceptable to the package producer or end use customer.

5) applying a coating of a pressure sensitive adhesive 59 to substantially the entire inner surface of support web 60 to produce an support web 70 that has been reverse printed, and coated with a pressure sensitive adhesive. A conventional pressure sensitive adhesive applicator 58 is shown in FIG. 10 as applying pressure sensitive adhesive to the inner now corona treated surface 57 (see FIG. 5) of the support web 42 of the support web 60, to produce an support web 70 that is now both reverse printed, and coated with a pressure sensitive adhesive on the inner surface. The pressure sensitive adhesive can be of any suitable composition and thickness, as disclosed herein. In one embodiment, the PSA is an emulsion based acrylic adhesive. The thickness of the coating of pressure sensitive adhesive may vary from one portion of the coated surface to another. This is acceptable as long as the finished package functions in its intended way with respect to its tamper evidence, and manually openable and reclosable features.

6) providing, in a selected portion of the inner surface of the support web, a clear area near and spaced apart from a first end of the support web.

Figure 11:
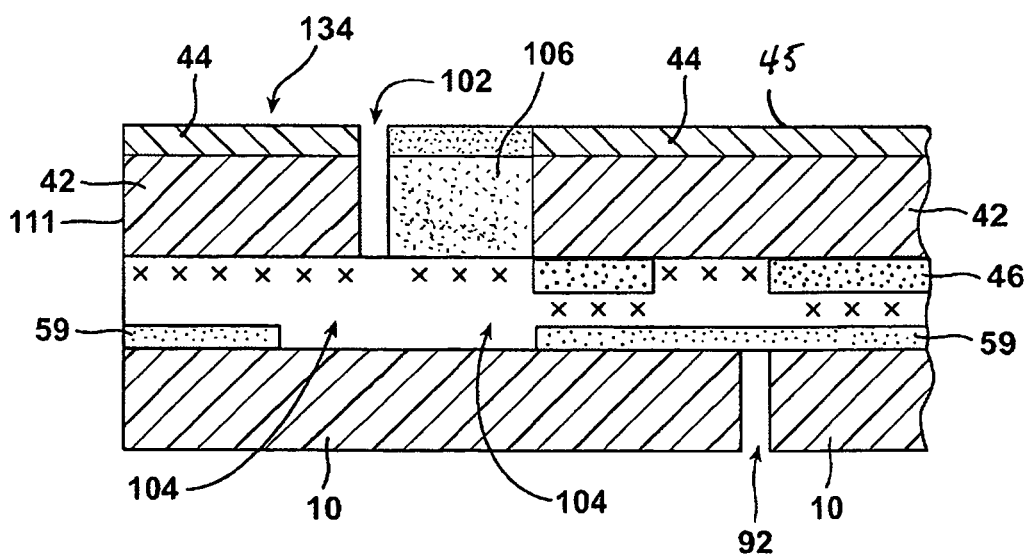
FIG. 11 is an enlarged elevational view of the printed laminate of FIG. 9.

The method of making the clear area is discussed in more detail herein with respect to FIG. 11.

7) curing the coating of pressure sensitive adhesive. Curing can be accomplished by any suitable and known means, including hot air drying by a conventional hot air dryer 71.

8) bringing the substrate film 10, and the support web 70 together, e.g. through nip rolls 74 or other suitable means, such that the pressure sensitive adhesive is disposed between the substrate film 10 and the support web 70, and adheres the substrate film 10 and the support web 70 together. The result is a laminated lidstock 80 (see FIG. 7).

9) making a first die cut in the substrate film, but not substantially in the support web. A conventional die cutter 76 can be used to create a first die cut 92. The first die cut 92 is made to define the portion of the substrate film that will ultimately form a flap that can be pulled back from the remainder of the substrate film, when the package is opened, to provide access to the food contents of the package. This is described in more detail below. The result is a laminated lidstock 90 (see FIG. 8) having die cut 92.

Figure 8:
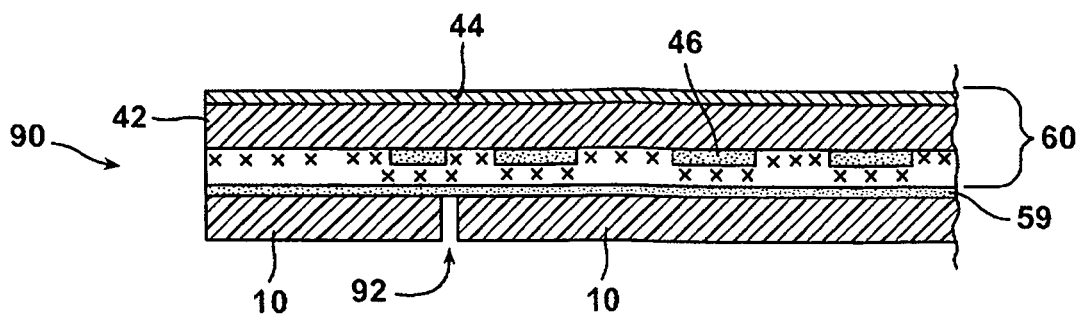
FIG. 8 is a schematic elevational view of an end portion of the printed laminate of FIG. 7, with a die cut pattern extending through the substrate film of FIG. 7.

Referring to FIG. 8, it will be noted that the die cut 92 extends through the substrate film 10, but is not substantially present in the support web. In practice, the die cut may sometimes extend to a small extent into the support web as well, but this is incidental, and does not affect the functionality of the invention, as long as the support web remains substantially unaffected by the die cut. Die cuts can be made by any suitable conventional process and equipment, such as using rotary engraved dies, steel rule dies supported in platens as used in reciprocating presses, or commercially available laser cutting or scoring equipment.

The pattern of the die cut is in one embodiment U-shaped, as show in plan view in FIG. 12. Any suitable pattern of die cut can be used, as long as it serves the function of providing an easy open/reclosable package in which the packaged product can be accessed by means of a flap created by the die cut. Alternative patterns include triangular, three side rectangle, hour glass, and other shapes.

Referring to FIG. 8, it will be noted that in one embodiment the first die cut 92 extends completely through the substrate film 10. In practice, the cut may sometimes extend through most of, but not entirely through, the thickness of the substrate film. The die cut in this embodiment is thus in the nature of a score rather than a complete cut. Thus, the cut 92 extends through e.g. at least 50% of the thickness of substrate film 10, e.g. at least 60%, at least 70%, at least 80%, at least 90%, at least 95%, or 100% of the thickness of substrate film 10.

10) making a second die cut in the support web, but not substantially in the substrate film.

In one embodiment, a laser system 78 can be configured to produce a laser cut that cuts through the support web (e.g. PET film) but does not cut the underlying substrate film. PET in particular is difficult to cut with a conventional die cut system, and a laser system has proven advantageous in making a controlled cut through a PET-based film material. The result is a die cut, laser cut, printed laminated lidstock 100 (see FIG. 9) having die cut 92 and laser cut 102.

Alternatively, a second die cut can be made using a mechanical cutting system using rotary engraved dies, or steel rule dies supported in platens as used in reciprocating presses. The choice of die cutting technique depends on several factors, including the thickness and physical nature of the film or web to be cut. For example, an alternative is to use a substrate film of close gauge tolerance, and a support web of close tolerance (e.g. BOPP), and use rotary dies to cut both in the same pass.

Referring to FIG. 9, it will be noted that in one embodiment the second die cut 102 extends completely through the support web 70. In practice, the laser cut may sometimes extend through most of, but not entirely through, the thickness of the support web. The die cut in this embodiment is thus in the nature of a score rather than a complete cut. Such an embodiment may be advantageous as described further herein. Thus, the cut 102 extends through e.g. at least 50% of the thickness of support web 60, e.g. at least 60%, at least 70%, at least 80%, at least 90%, at least 95%, or 100% of the thickness of support web 70.

Laser cuts can be made by any suitable conventional process and equipment.

The pattern of the laser cut is in one embodiment simply linear, parallel to the edges of the finished package. Alternatively, as show in plan view in FIG. 15, the laser cut can "undulate" in direction such that each finished package includes a laser cut with a central linear component 112, and curved end components 114. This particular embodiment provides a pull tab 106 that can conveniently be used by the consumer to open the package, and that can be used in association with a tamper evident feature discussed in more detail below. Any suitable pattern of laser cut can be used, as long as it serves the function of providing a tamper evident manually openable/reclosable package in which the packaged product can be accessed by means of a pull tab 106 created by the laser cut.

The laminated lidstock 100 can be advanced onto a roll, to be used by e.g. a food packager as lidstock, or sent to storage or further processed. The steps of this process can be carried out by otherwise conventional equipment familiar to those of skill in the art.

With reference to FIG. 10A, an alternative method of making a printed laminated lidstock is shown. This method is like that shown in FIG. 10, but the first die cut is made in the substrate film 10 before the substrate film and the support web are laminated together. Also, as shown the die cut is made from the outer surface 29 of the substrate film, rather from the inner surface 27 as shown In FIG. 10. In some embodiments, then die cut can be a score that does not extend completely through the substrate film 10. Depending on the nature of the materials used for substrate film 10, a score may be enough to provide a manual opening feature as disclosed herein.

In yet another embodiment, the second die cut can be made in the support web as shown for FIG. 10, after the pressure sensitive adhesive has been applied to the support web, but before the substrate film and the support web are brought together.

The method as described in FIGS. 10 and 10A can be done at a single location, with substrate film 10 and support web 40 either made on-site or provided by an outside vendor, and thus prepared elsewhere and provided in advance of the process. The subsequent steps described can be done on a continuous sequential basis, or in discrete steps at different locations at the same site, or by a plurality of operators performing these steps at different locations. Thus, the method as described can be either one continuous process, or a series of distinct processes, as long as the final laminated lidstock 100 is produced using each step in the process.

Referring to FIG. 11, an enlarged view of a portion of FIG. 9, it can be seen that a clear area 104 in the pressure sensitive adhesive, i.e. a portion of the support web 60 on which no substantial amount of pressure sensitive adhesive is present, creates a discontinuity that results in a portion of the support web 60, designated by the stippled area 106, that does not have a significant amount of pressure sensitive adhesive thereon, and therefore is substantially not adhered to substrate film 10. Portion 106 thus effectively becomes a pull tab 106, latent (i.e. in flattened form and essentially non-accessible) in the laminated lidstock, but actual (still in flattened form but now accessible for its intended purpose after the matrix is removed from a package) in each individual trayed package made from the laminated lidstock, that can be used by the consumer to initiate the easy opening of the package. Pull tab 106 is spaced apart from a first end of a package made from the laminated lidstock. The pull tab comprises an intermediate portion of the support web, spaced from the first die cut, defined by the second die cut, a first side edge of a package made from the laminated lidstock, and a second side edge of a package made from the laminated lidstock. The pull tab is adjacent the matrix.

In practice, a relatively small amount of pressure sensitive adhesive may actually be present in some or all of the clear area 104. The clear area 104 can be made by e.g. 1) initially avoiding the application of pressure sensitive adhesive to the surface area of support web 60 defined by 104; or 2) applying the pressure sensitive adhesive relatively uniformly over the inner surface 42 of support web 60, followed by masking or deadening the pressure sensitive adhesive in the area 104 by any suitable means, before taking the step of bringing the substrate film 50, and the support web 70 together, e.g. through nip rolls 74 or other suitable means, such that the pressure sensitive adhesive is disposed between the substrate film 10 and the support web 70, and adheres the substrate film 10 and the support web 70 together; or 3) applying the pressure sensitive adhesive relatively uniformly over the inner surface 42 of support web 60, followed by removing most or all of the pressure sensitive adhesive in the area 104, e.g. by scraping the pressure sensitive adhesive off the support web by suitable means such as a shim or scraper. The result is that the clear area 104 may have a very small amount of pressure sensitive adhesive present, e.g. an amount less than 20% of the pressure sensitive adhesive present on the remainder of the support web, such as less than 15%, less than 10%, or less than 5% of the pressure sensitive adhesive present on the remainder of the support web. Of course, in one embodiment there could be no pressure sensitive adhesive present in clear area 104. Some advantage may be obtained by having a very small amount of pressure sensitive adhesive present in clear area 104, in that the pull tab 106 that results will not prematurely come out of the plane of the lidstock of the finished package, making for a neat package, and one where the pull tab 106 is not significantly adversely affected by abuse from distribution and handling.

Figure 11A:
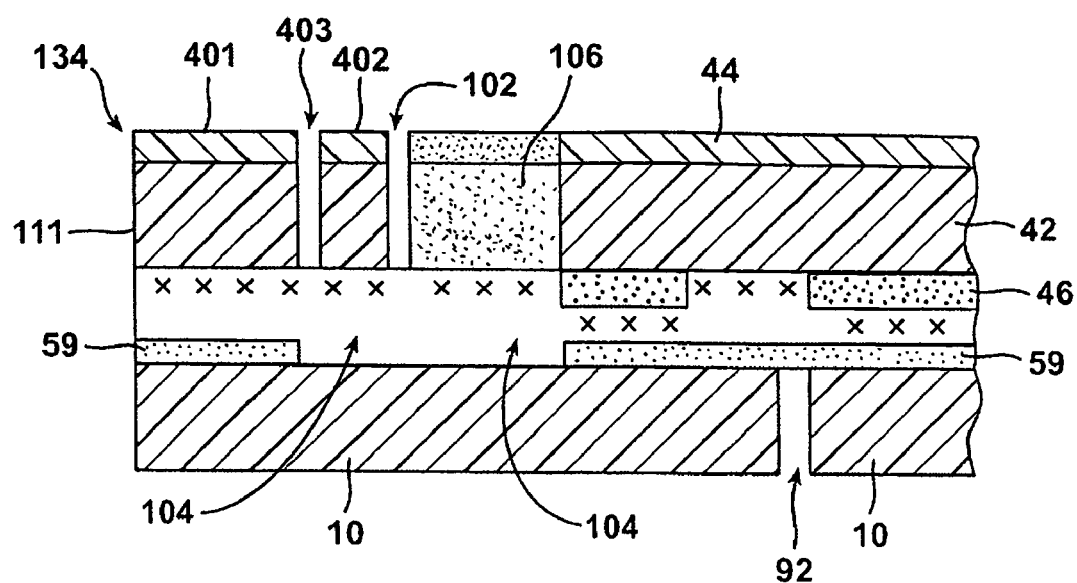
FIG. 11A is an enlarged elevational view of an alternative embodiment of the printed laminate of FIG. 9.

FIG. 11 also shows a matrix 134, comprising an end portion of support web 60 at a first end 111 of the laminated lidstock. Matrix 134 is defined by the first end 111 of the laminated lidstock (and more specifically the first end of the support web) that becomes part of the first end 111 of an individual package made from the lidstock; the second die cut 102; and the two side edges 107 of the laminated lidstock that become the two side edges of an individual package made from the lidstock. Referring to FIG. 11A, an enlarged view of an alternative embodiment of a portion of FIG. 9, it can be seen that matrix 134 is in two parts. One part 401, closest to the first end 11 of the lidstock and resulting package, overlies and is adhered to the substrate film 10 by means of the pressure sensitive adhesive 59. A second part 402 overlies substrate film 10, no substantial amount of pressure sensitive adhesive is present to adhere part 402 to substrate film 10. The two parts 401 and 402 are defined by a third die cut 403 positioned parallel to the second die cut 102. The result is that in the case of tampering of the package as described herein, even if an attempt is made to reinstall matrix 134 in its original position, it is very difficult to reinstall part 402, because it does not have on its inner surface, or on a corresponding outer surface of substrate film 60, a significant amount of pressure sensitive adhesive. Third die cut 403 can be installed in the support web in a manner similar to the second die cut, at any suitable point in the method described above.

Referring to FIG. 12, a bottom plan view of the laminated lidstock of FIG. 9 shows die cuts 92 in each of a registered series in the surface 27 of substrate film 10. Dotted lines 107 indicate the location at which the laminated lidstock 100 will be sealed and cut, e.g. perimeter heat sealed and cut, in registered fashion by otherwise conventional means as discussed herein, e.g. in horizontal form/fill/seal equipment, to create individual packages. Thus, lines 107 represent what will become the side edges and seals of individual packages when the laminated lidstock is fed as lidstock into a packaging system where it is progressively fed over filled trays, sealed to the trays, and cut to create finished packages. Line 140 represents what will become the second end and seal of individual packages. Line 111 represents what will become the first end and seal of individual packages. The laminated lidstock 100, as it exists when rolled up onto roll 101 (see FIGS. 10 and 10a), and as it feeds into horizontal form/fill/seal equipment in an otherwise conventional packaging operation, will have a second lateral edge 160 and first lateral edge 170. During the sealing and cutting operation to make individual, filled packages, the web will be cut such that the lidstock material between lines 170 and 111, and between lines 160 and 140, will be removed as scrap.

Any suitable thermoforming machines, such as those available from Multivac, Ti-romat, or Rapid Pak, can be used in accordance with the invention for packaging of food products, various industrial and consumer products and sterile medical products. Trays are formed from a lower web by heat and pressure, and can be loaded with product manually or automatically on the machine. After that, the packages are vacuumized or backflushed with modified atmosphere (if required), hermetically sealed to an upper web, separated, and removed for distribution or storage.

Figure 13:
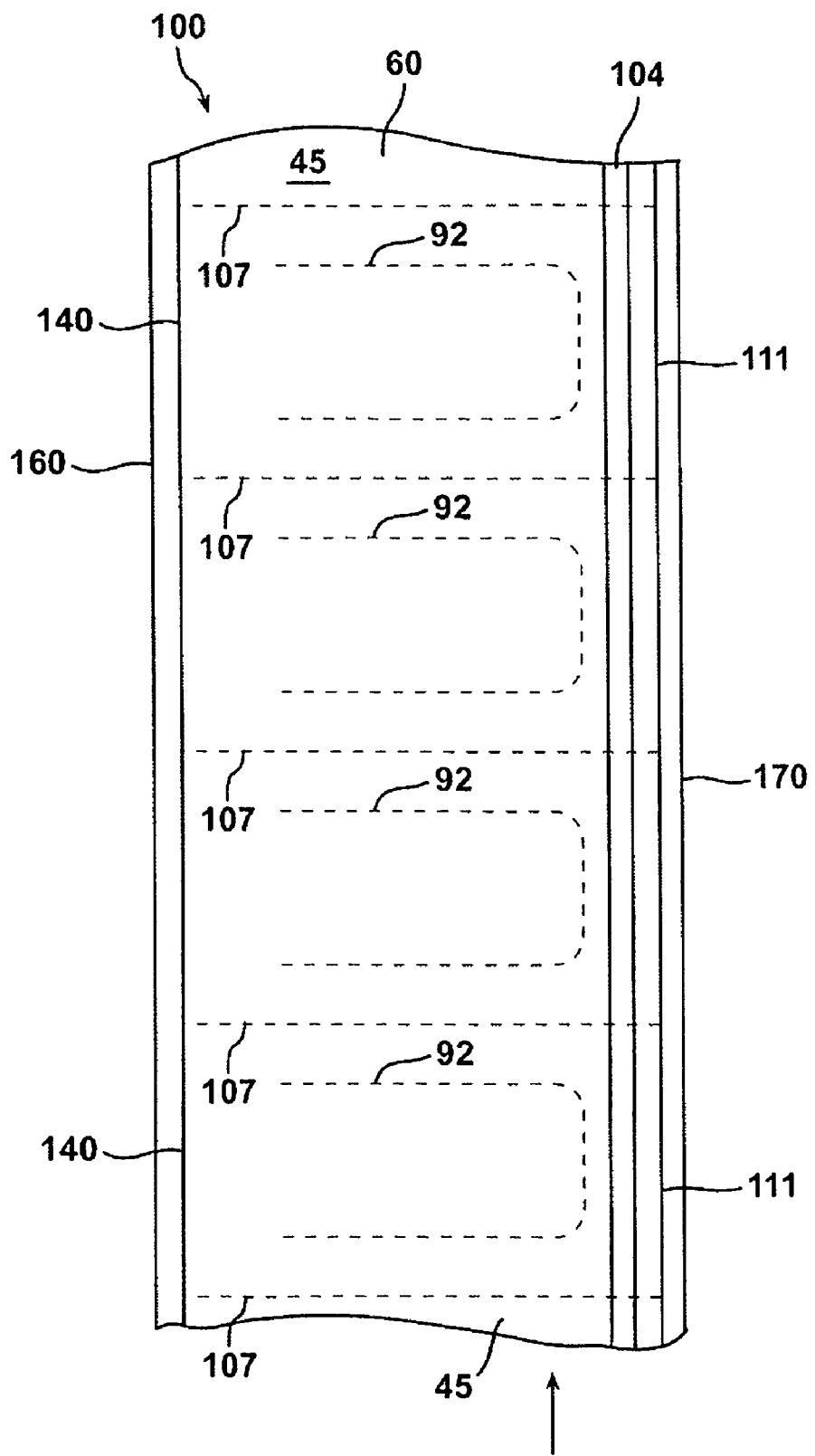
FIG. 13 is a schematic top plan view of the printed laminate of FIG. 9.

FIG. 13 is a top plan view of the laminated lidstock of FIG. 9, viewed through surface 45 of support web 40.

Figure 14:
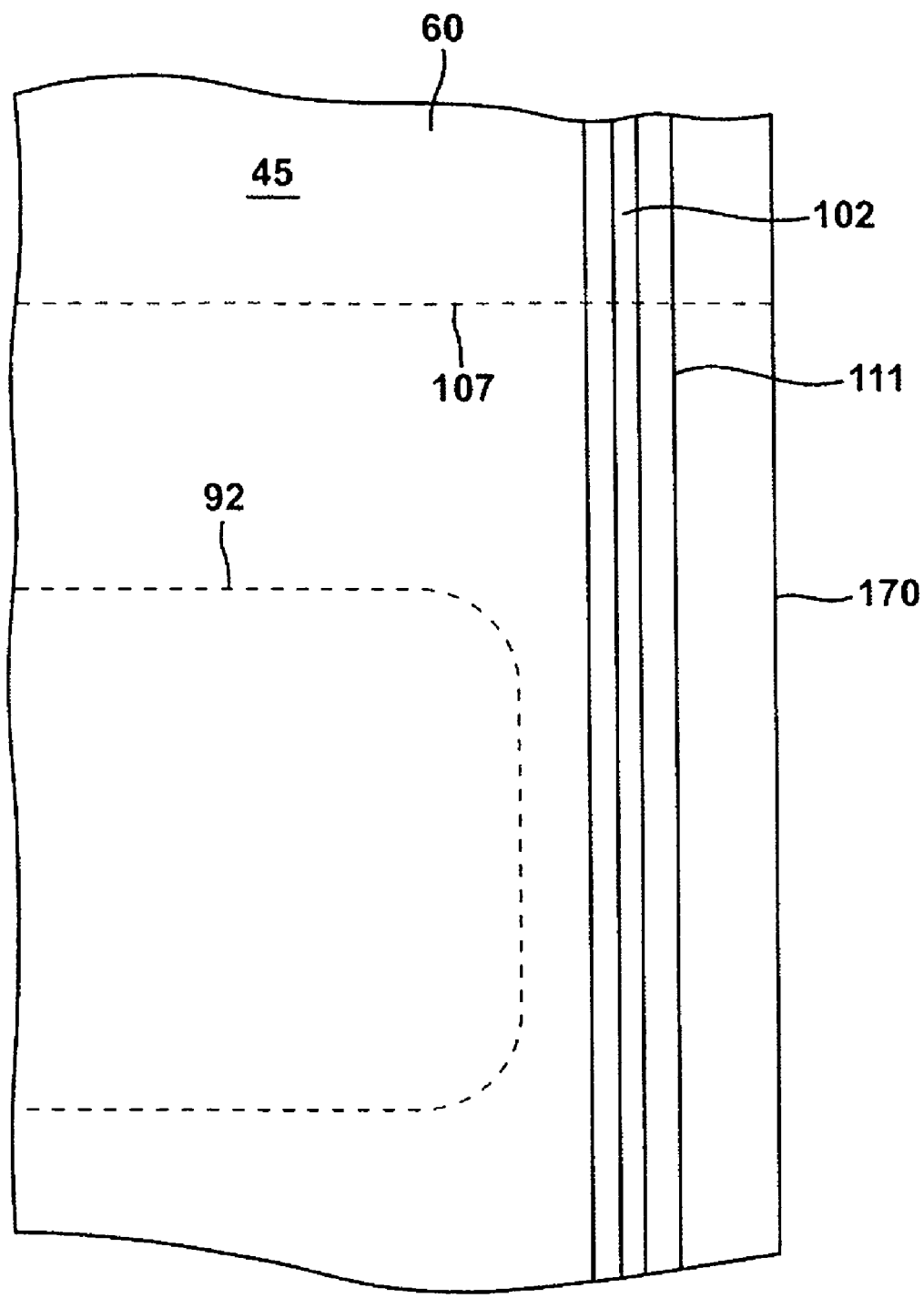
FIG. 14 is an enlarged top plan view of a portion of the printed laminate of FIG. 13.

FIG. 14 shows in enlarged view the second die cut 102. It will be understood, both with respect to the first die cut 92 and second die cut 102, that the graphic depictions of these elements in the drawings are typically exaggerated for purposes of understanding the invention, and that the actual dimensions of these elements will be typically very small, with little or no material actually removed from the relevant web.

Figure 15:
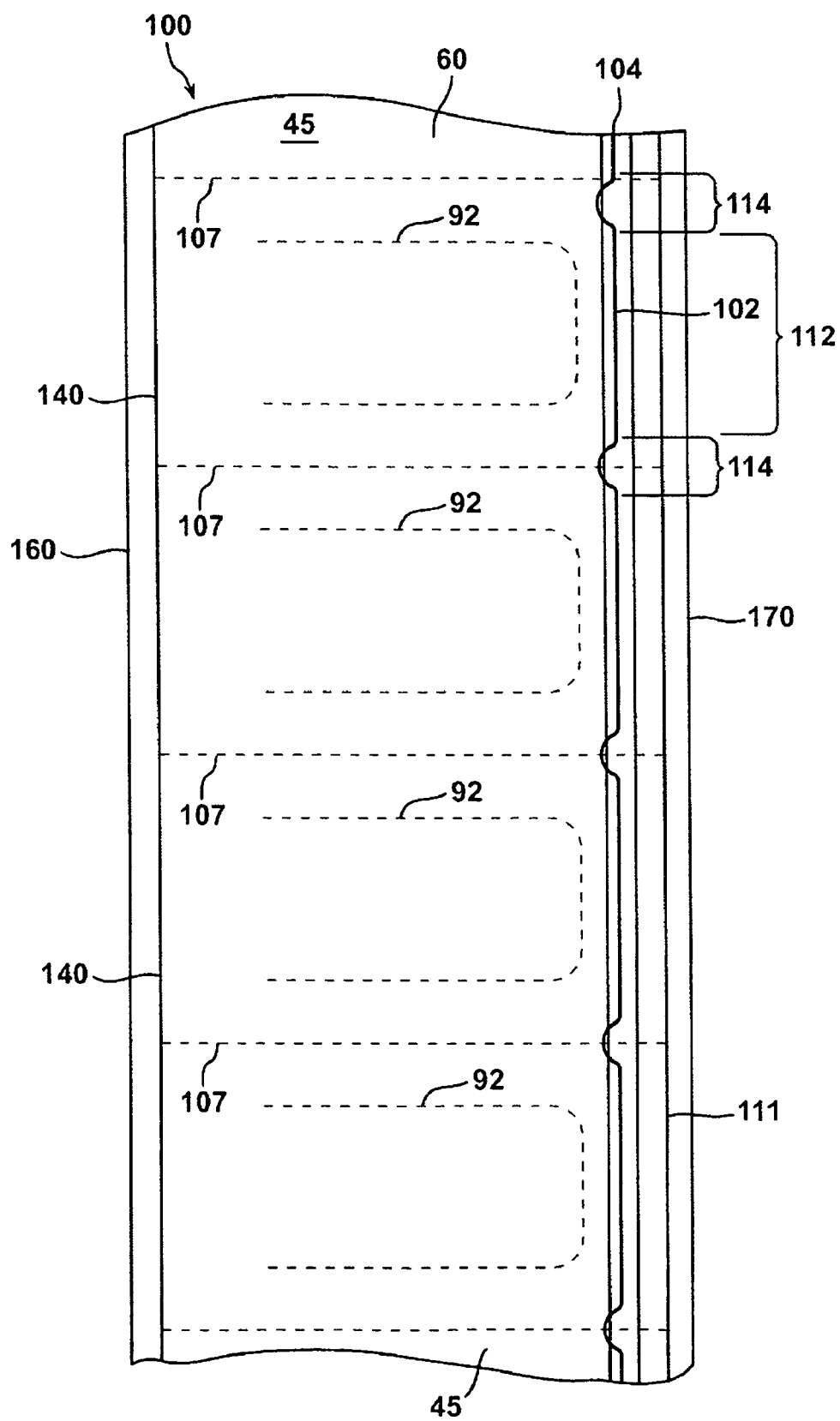
FIG. 15 is a schematic top plan view of an alternative embodiment of the printed laminate of FIG. 9.
Figure 16:
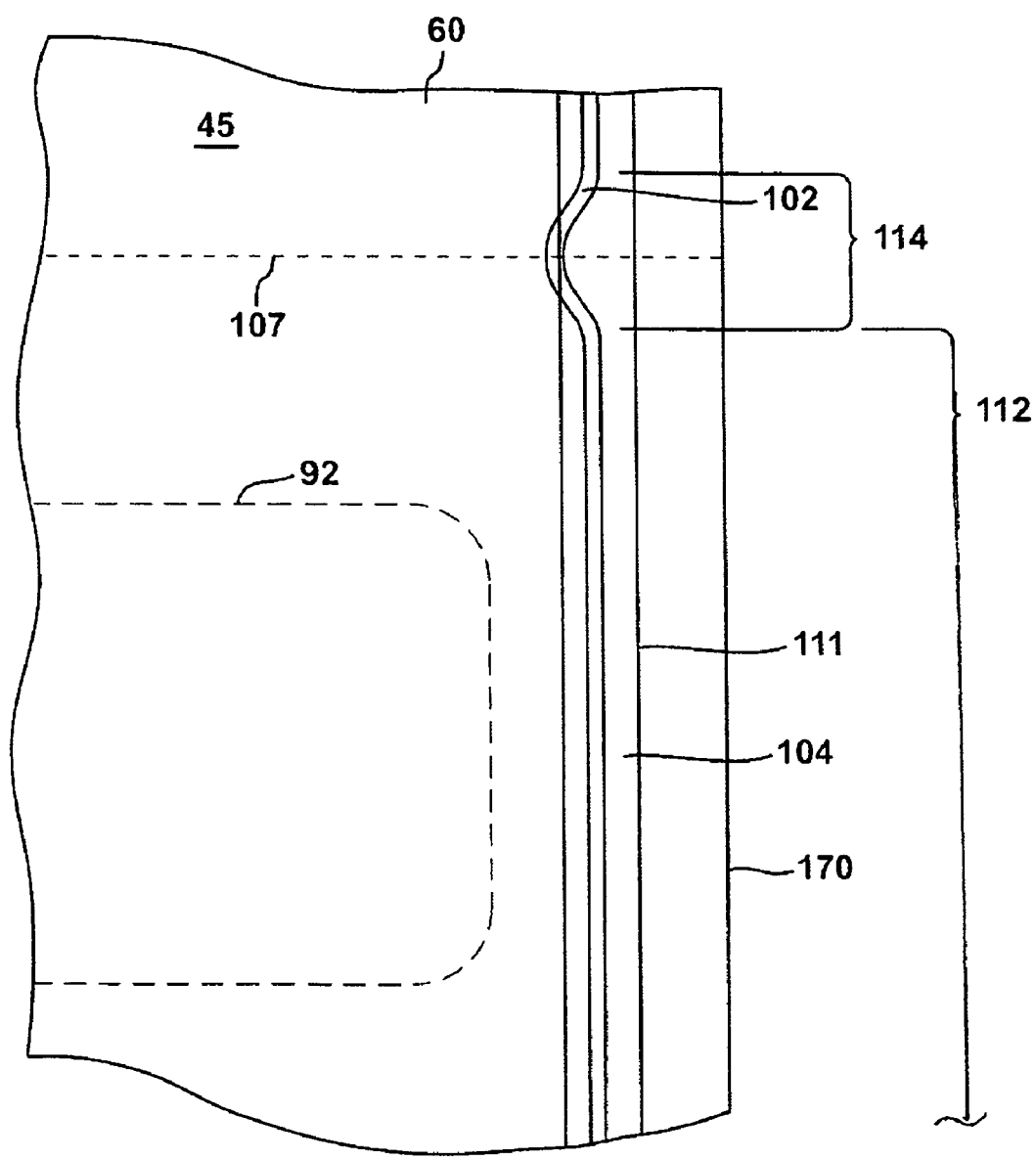
FIG. 16 is an enlarged top plan view of a portion of the printed laminate of FIG. 15.

As shown in FIGS. 15 and 16, and in particular at reference 114 of FIG. 16, although in one embodiment the second die cut 102 can be totally linear, and will typically run parallel to and spaced apart from the first end 111 of the laminated lidstock (ultimately the first end 111 of the finished package), non-linear components can be included in a repeating pattern such that each finished package will have a curved end portion at each extremity of the pull tab 106. This can aid the user in initiating opening of the package.

Figure 17:
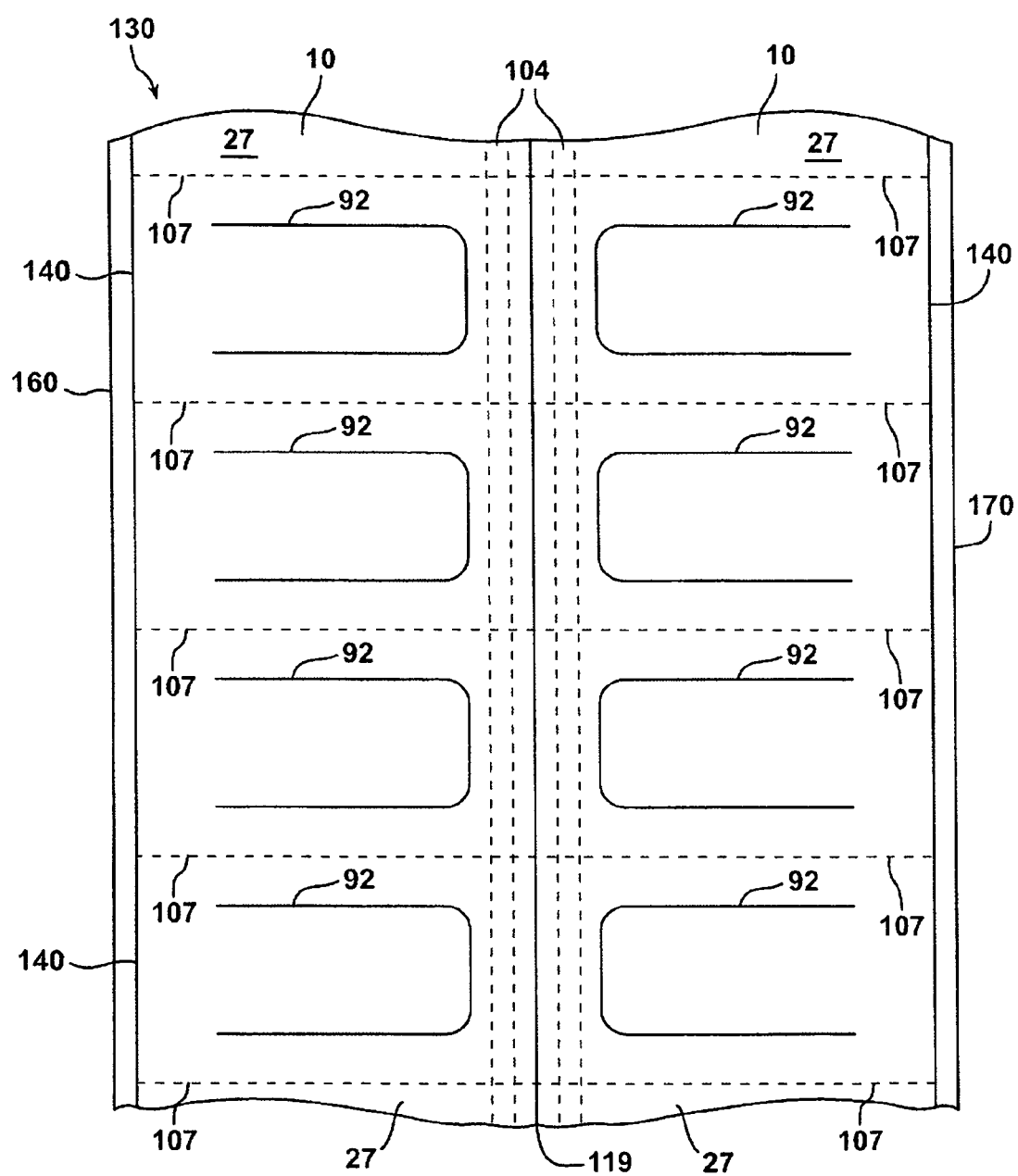
FIG. 17 is a schematic bottom plan view of yet another alternative embodiment of the printed laminate of FIG. 9.
Figure 18:
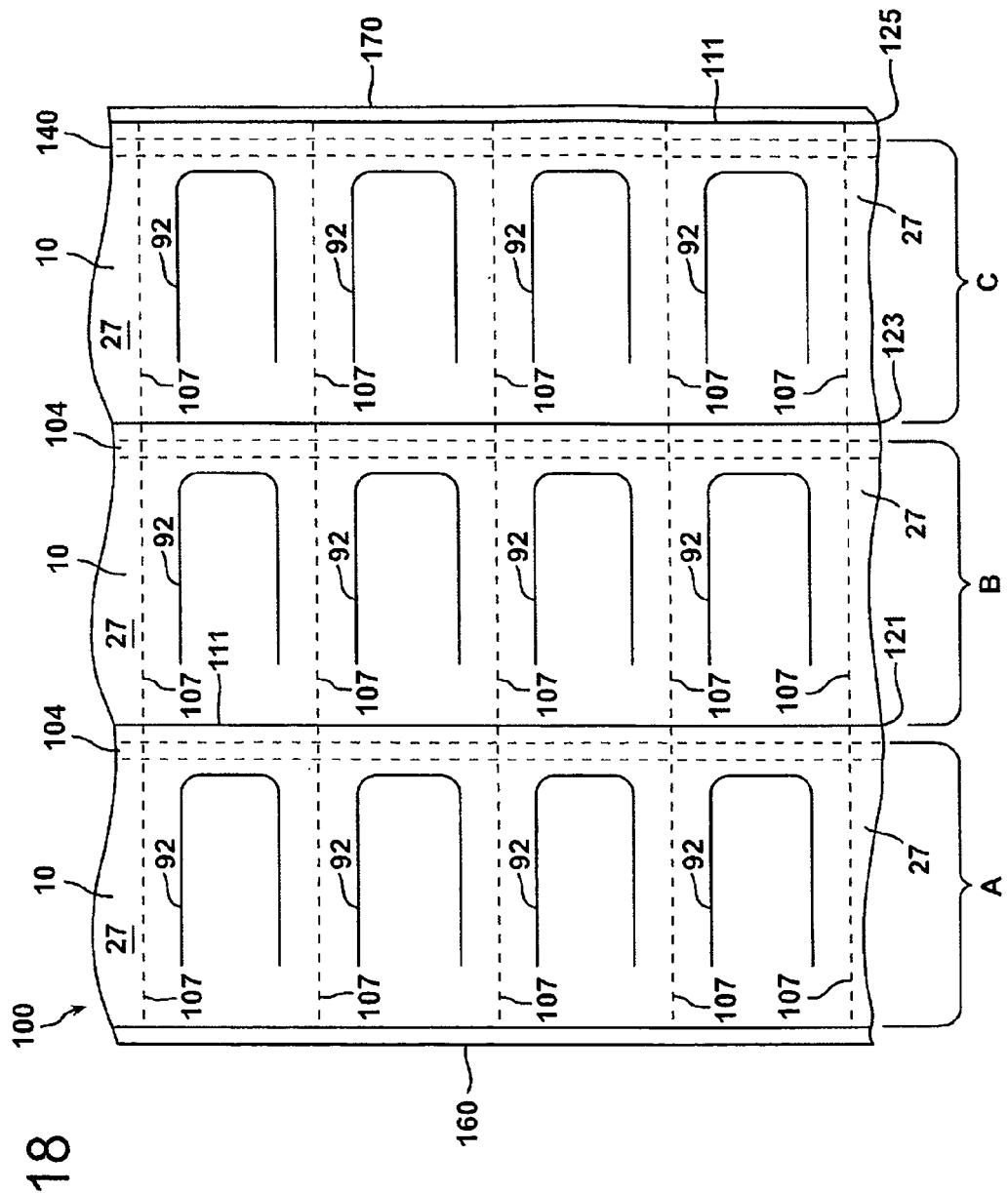
FIG. 18 is a schematic bottom plan view of still another alternative embodiment of the printed laminate of FIG. 9.

FIGS. 17 and 18 show two alternative embodiments of FIG. 12. In FIG. 17, the laminated lidstock is produced as described above, but "two across", so that when run in a packaging machine, with suitable machine die set-ups, two, four, etc. packages can be made simultaneously. In addition to the seal and cut steps at locations 107, the web is cut at center line 119, and this line will mark the first end of the individual packages.

Referring to FIG. 18, in a "three across" format, the laminated lidstock is run on a packaging machine as described above. It will be noted that the die cuts are made (and if printed with decorative print, the printed images are so aligned) so that individual packages made from the longitudinal portion "A" of FIG. 18 will have a first end 121; individual packages made from the longitudinal portion "B" of FIG. 18 will have a first end 123; and individual packages made from the longitudinal portion "C" of FIG. 18 will have a first end 125.

It will be evident from the above discussion that the first end of the laminated lidstock, of each of the substrate film and support web, and of the finished package (lidstock sealed to the tray flange of a filled tray), will be that end that is near to and spaced apart from the second die cut, and that end that will form part of the tamper evidence device.

Figure 21:
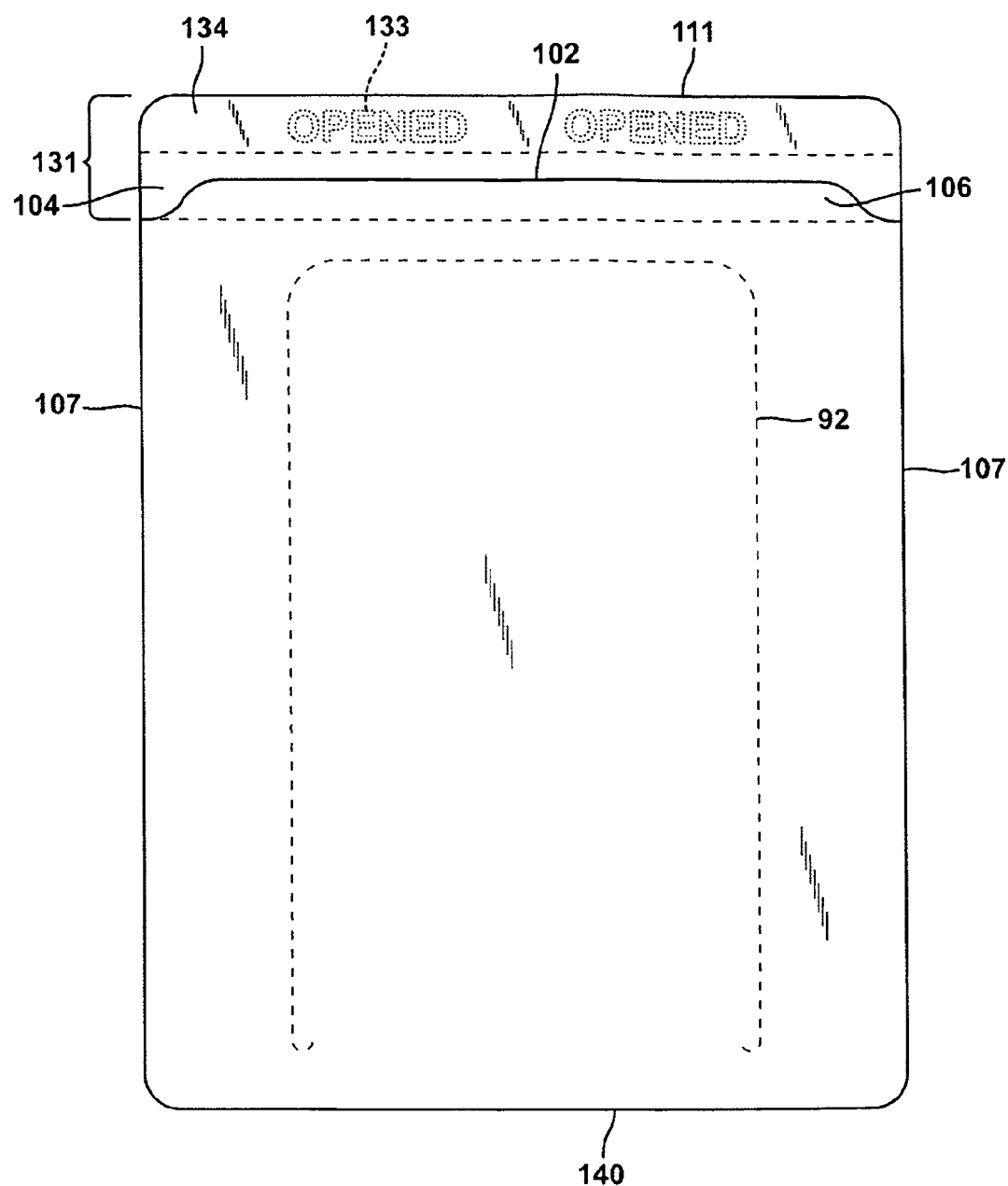
FIG. 21 is a schematic top plan view of a laminated lidstock and package, showing a first tamper evidence device in an unremoved condition.
Figure 23:
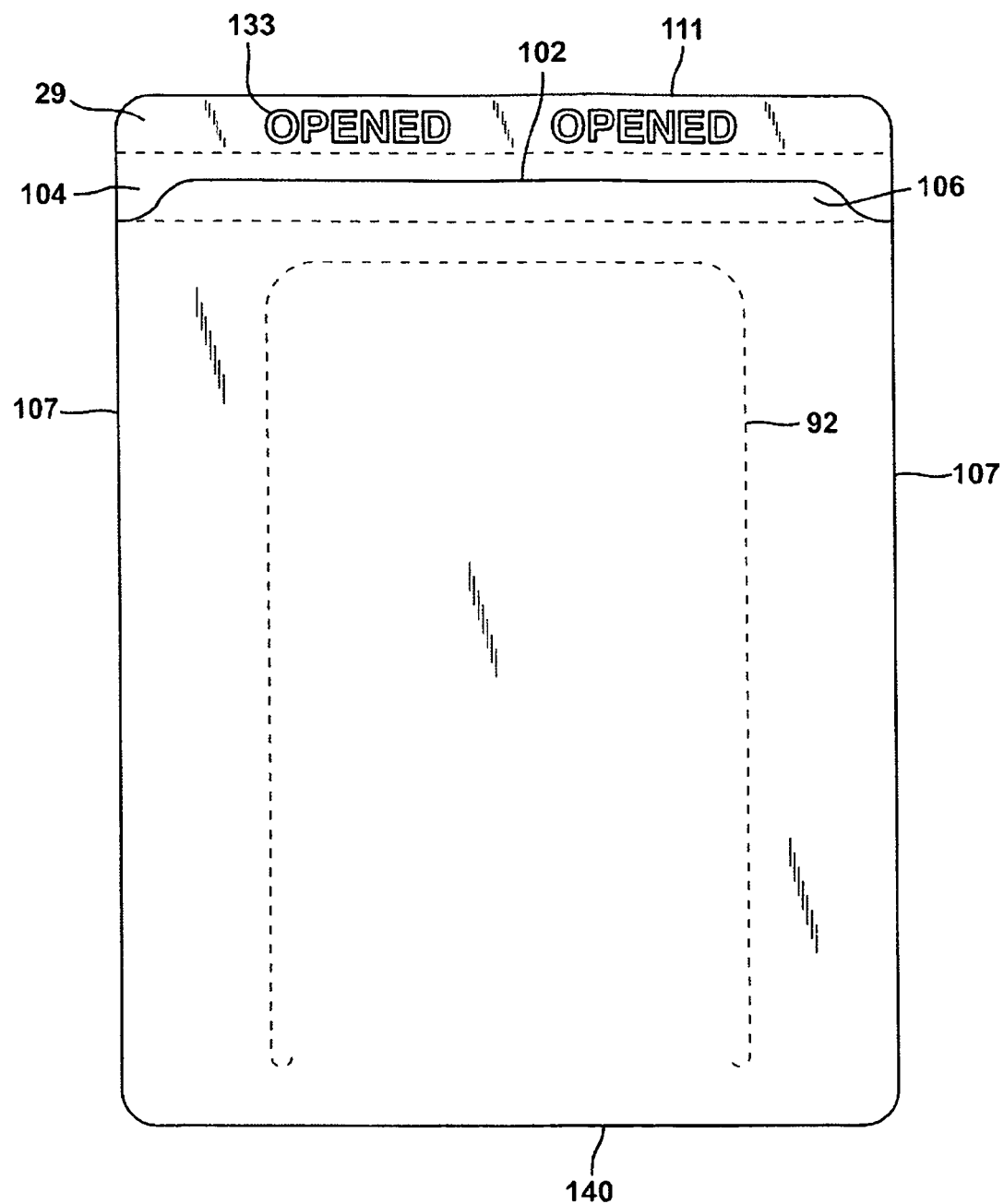
FIG. 23 is a schematic top plan view of the laminated lidstock and package of FIG. 21, showing the first tamper evidence device in a totally removed condition.

FIGS. 21 to 23 represent one embodiment of the tamper evidence device 131. A message 133, e.g. in the form of a printed indicia, e.g. a graphical pattern, or a text such as "opened", is surface printed at the first end of the substrate film 10 on surface 29. The inner surface 43 of support web 10 is reverse printed (not shown for clarity), at least at the first end of the support web corresponding to the first end of the substrate film, with a flood coat of ink, or other indicia that masks the message while the matrix 134 is undisturbed. When the matrix 134 of the support web is manually or otherwise pulled from the support web, the message becomes evident, indicating tampering of the package. Alternative to the reverse print, the outer surface 45 of the support web 10 is surface printed (not shown for clarity), at least at the first end of the support web corresponding to the first end of the substrate film, with a flood coat of ink, or other indicia that masks the message.

Figure 19:
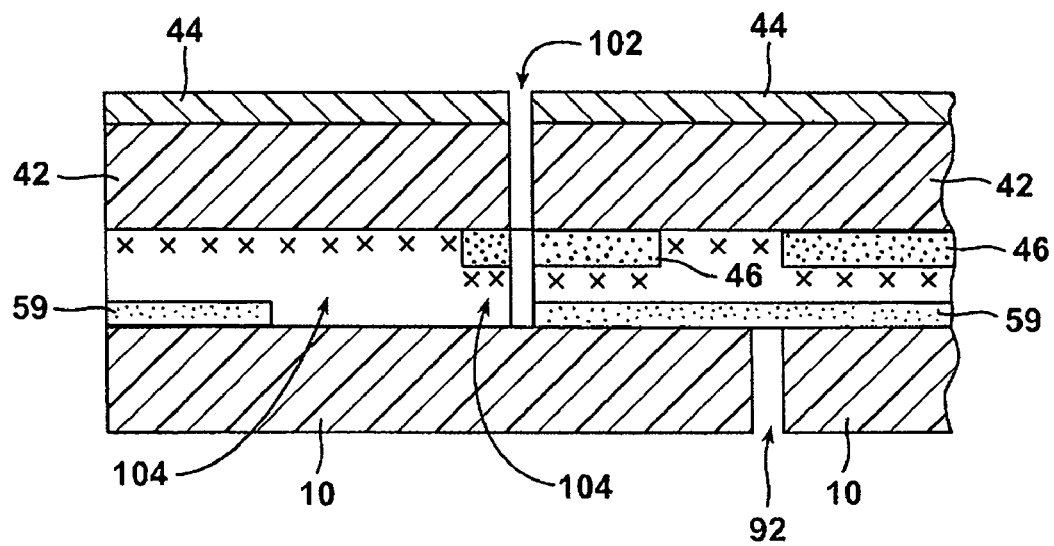
FIG. 19 is an enlarged elevational view of the printed laminate of FIG. 9, like FIG. 11, but viewed in the region XIX of the printed laminate.
Figure 21A:
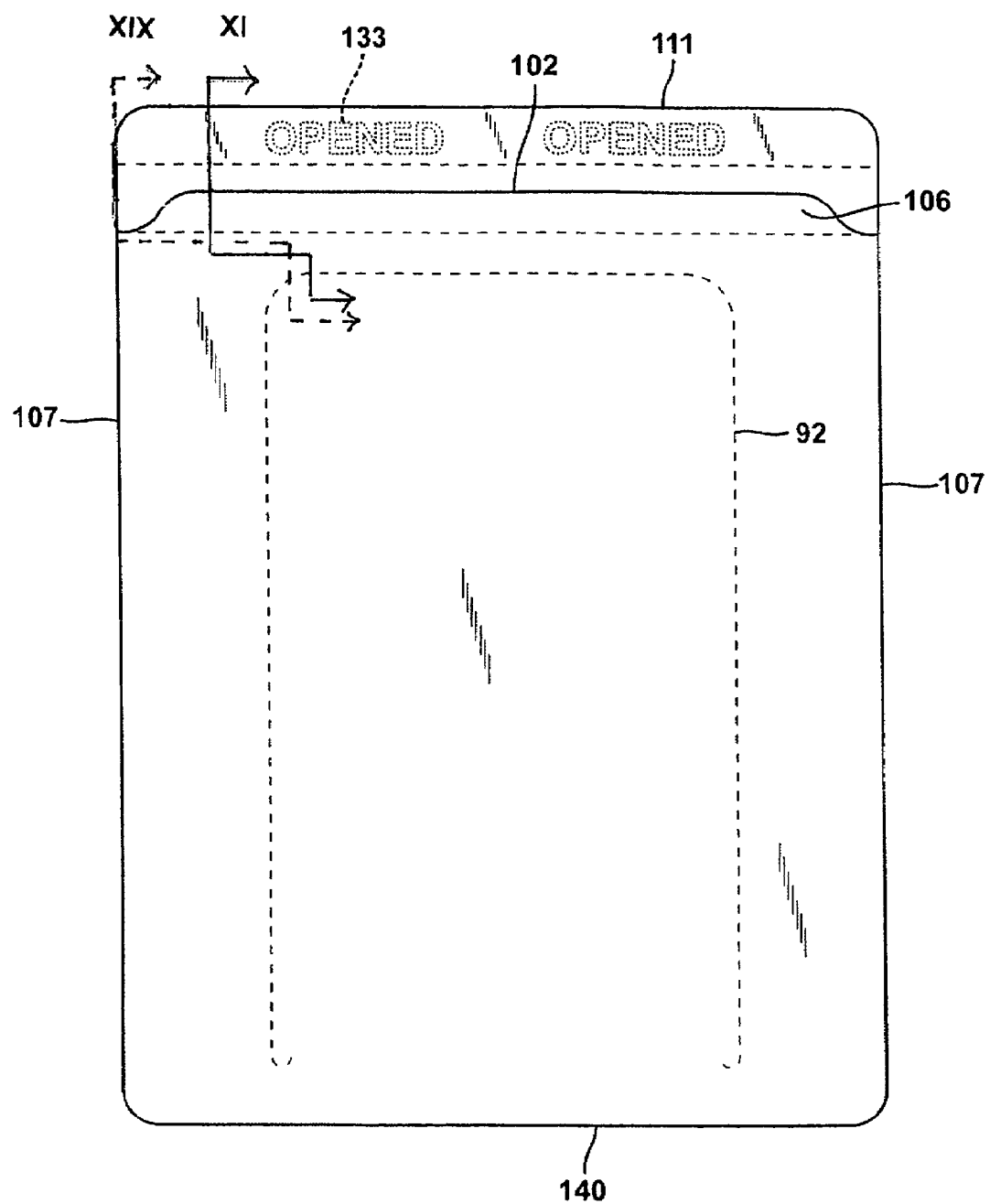
FIG. 21A is another schematic top plan view of a laminated lidstock and package, showing the first tamper evidence device in an unremoved condition.

FIG. 21A is a schematic top plan view of a laminated lidstock and package, like FIG. 21, but showing reference to cross-sections XI, as shown in FIG. 11, and XIX, as shown in FIG. 19.

Figure 24:
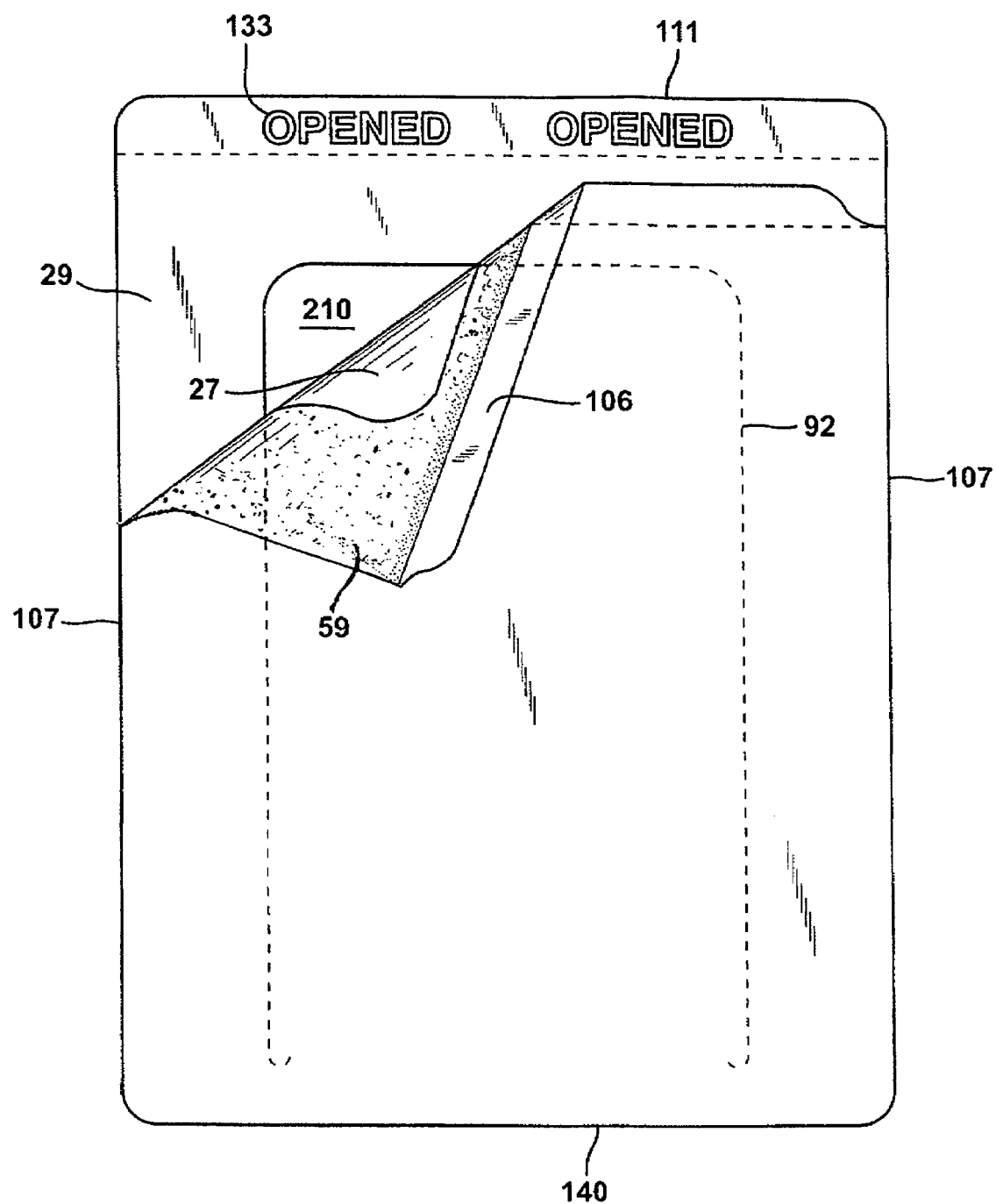
FIG. 24 is a schematic top plan view of the laminated lidstock and package of FIG. 23, showing the package in a partially opened condition.

FIG. 24 shows a top plan view of a finished package in which the tamper evidence device 131 has been activated, and in addition the pull tab 106 has been manually pulled away from the package. Pressure sensitive adhesive 59 is shown in the marginal regions of support web 40, and the tray cavity 210 is now partially open to access food product (not shown).

Figure 25:
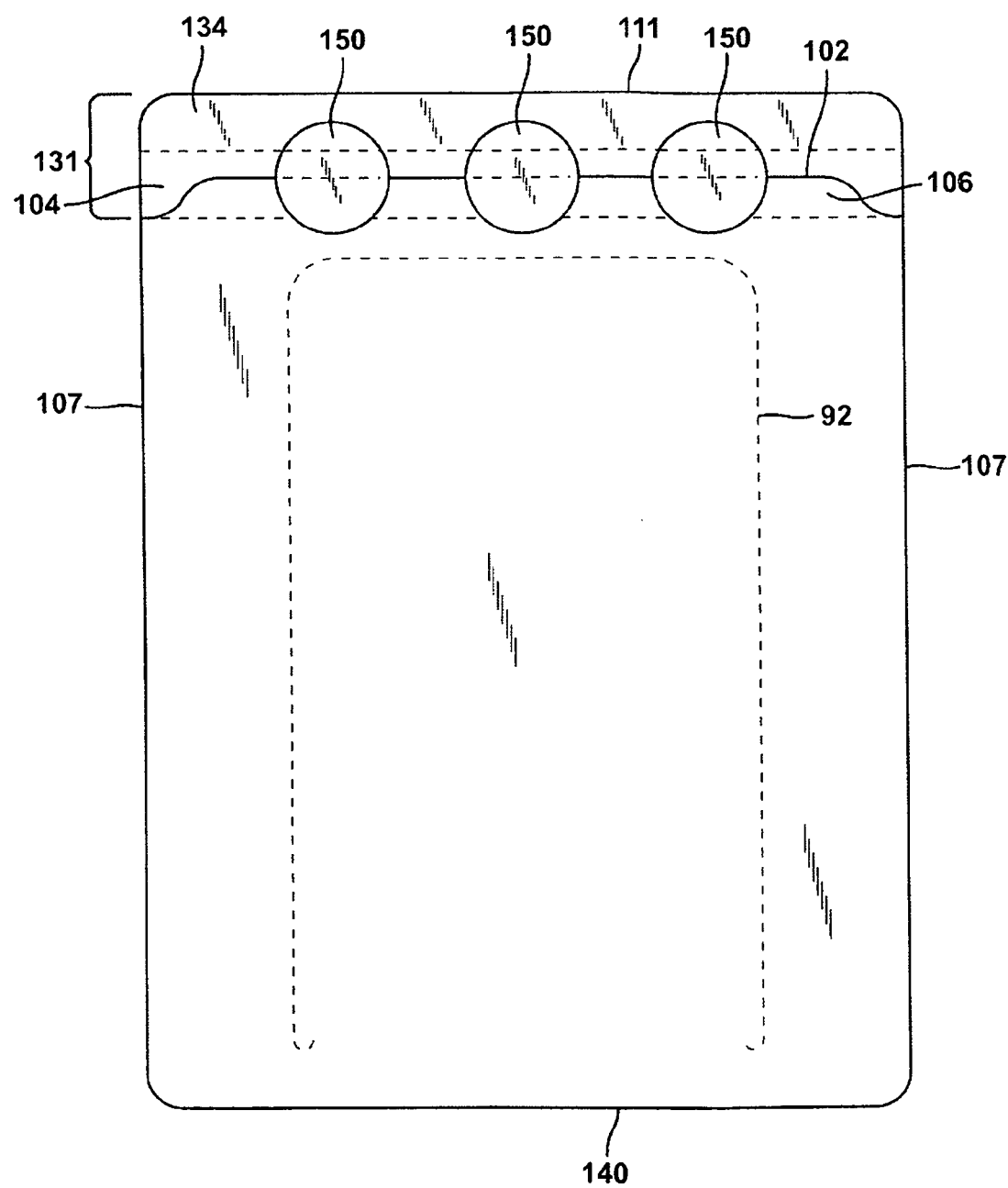
FIG. 25 is a schematic top plan view of a laminated lidstock and package, showing an alternative tamper evidence device in an unremoved condition.
Figure 26:
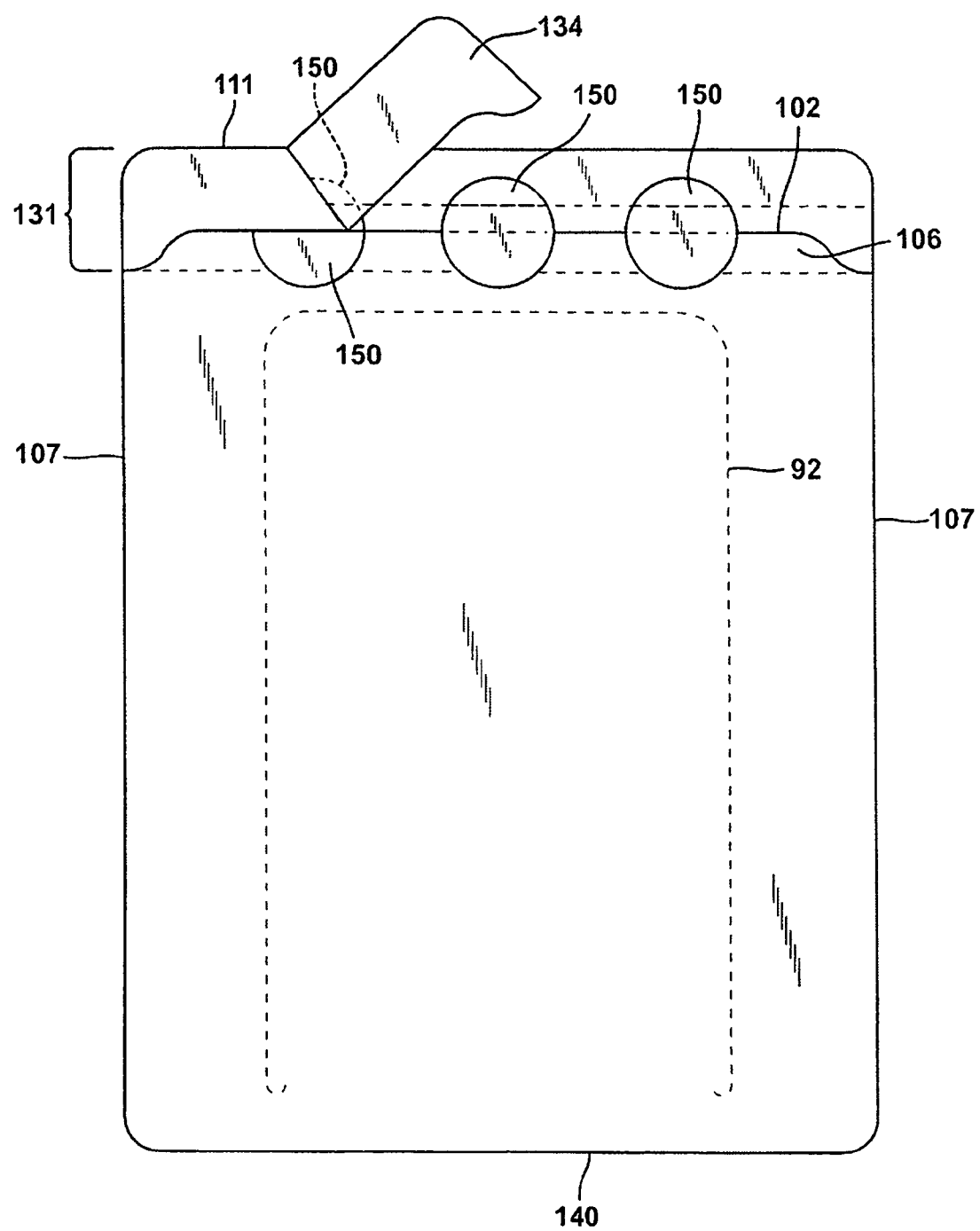
FIG. 26 is a schematic top plan view of the laminated lidstock and package of FIG. 25, showing the tamper evidence device in a partially removed condition.
Figure 27:
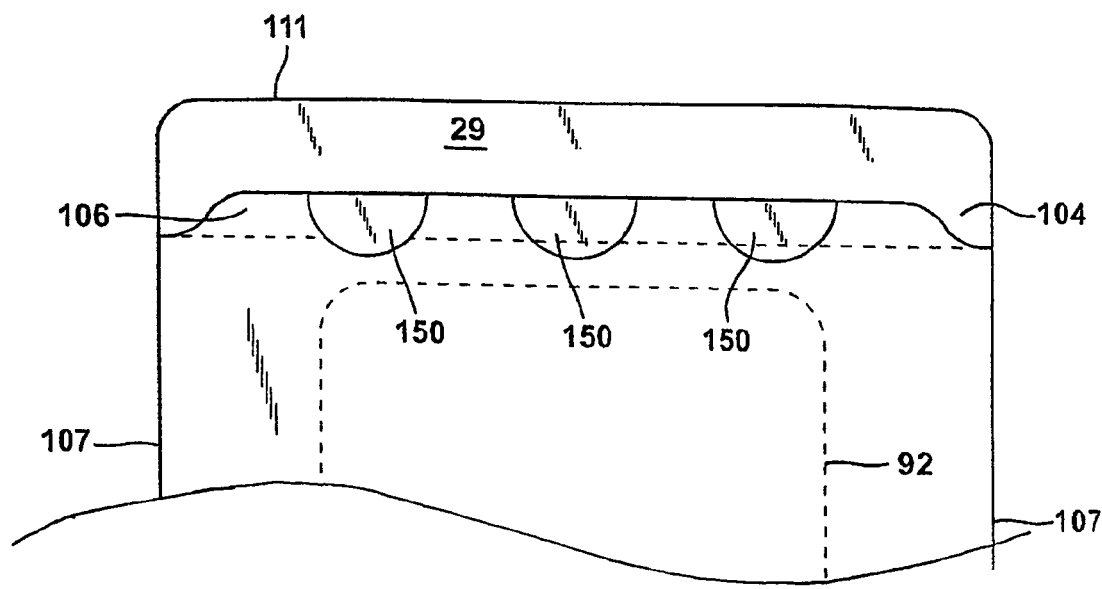
FIG. 27 is a schematic top plan view of the laminated lidstock and package of FIG. 25, showing the tamper evidence device in a totally removed condition.

FIGS. 25 to 27 represent another embodiment of the tamper evidence device 131. A series of labels 150 are disposed in overlapping relationship to both the end portion of support web 40 and the remaining portion of the support web, by straddling second die cut 102. Labels 150 can be made from any suitable material, e.g. paper or frangible plastic, can be of any suitable shape, and can be used in any suitable number on a given package. When the matrix 134 of the support web is manually or otherwise pulled from the support web (see FIG. 26), the labels will distort or tear in such a way as to indicate tampering of the package (see FIG. 27.

Figure 28:
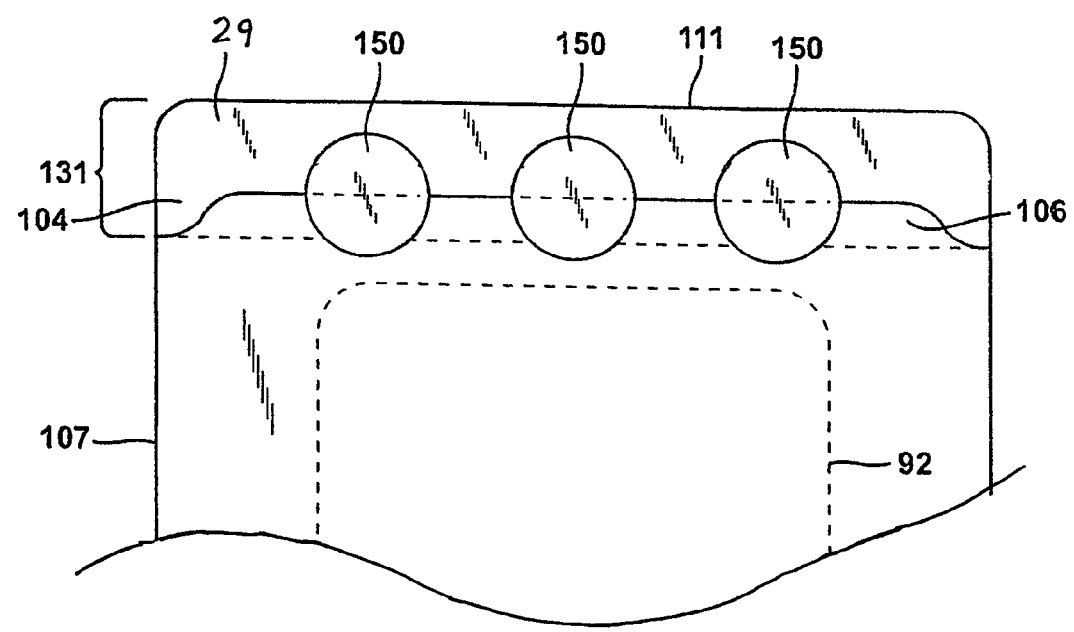
FIG. 28 is a schematic top plan view of a laminated lidstock and package, showing another alternative tamper evidence device in an unremoved condition.

In yet another alternative embodiment (FIG. 28), a tamper evidence device 131 is like that of FIGS. 25 to 27, but in which the matrix 134 is pulled from the support web before application of labels 150 in overlapping relationship to both the end portion of substrate film 10 (since the end portion of support web 40 represented by the matrix has already been removed) and the remaining portion of the support web, by straddling second die cut 102. The tamper evidence device 131 will otherwise operate like that of FIGS. 25 to 27.

3. Package

Figure 20:
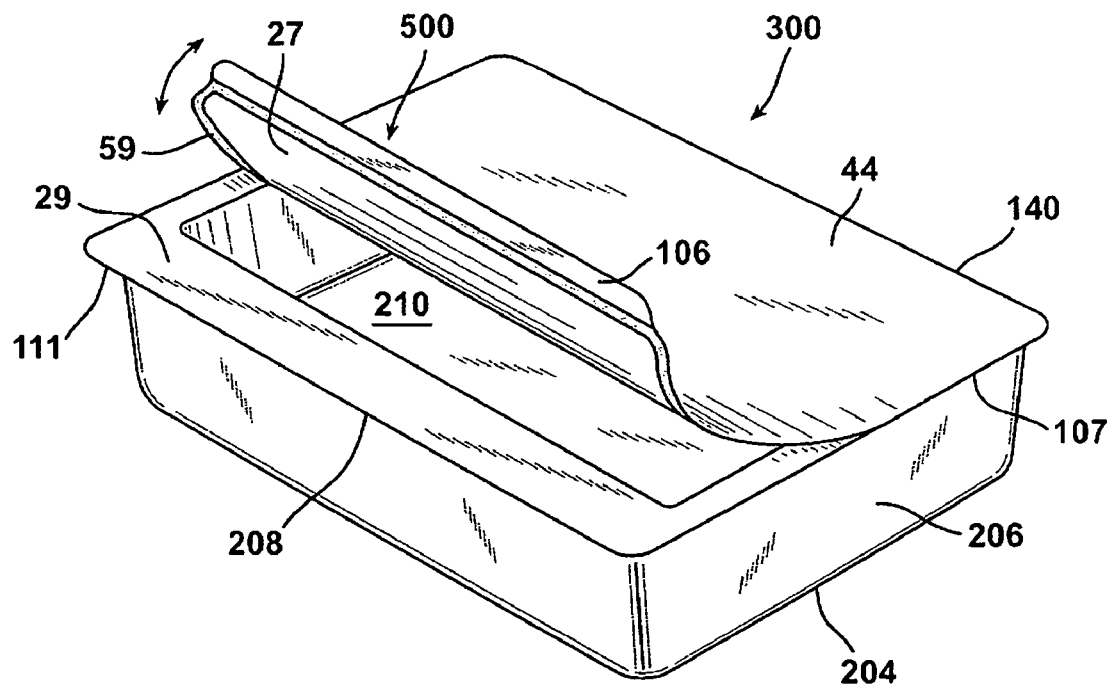
FIG. 20 is a perspective view of a package in accordance with the invention, in a partially opened condition.

Referring to FIG. 20, in one embodiment, an otherwise conventional packaging operation results in package 300.

Figure 29:
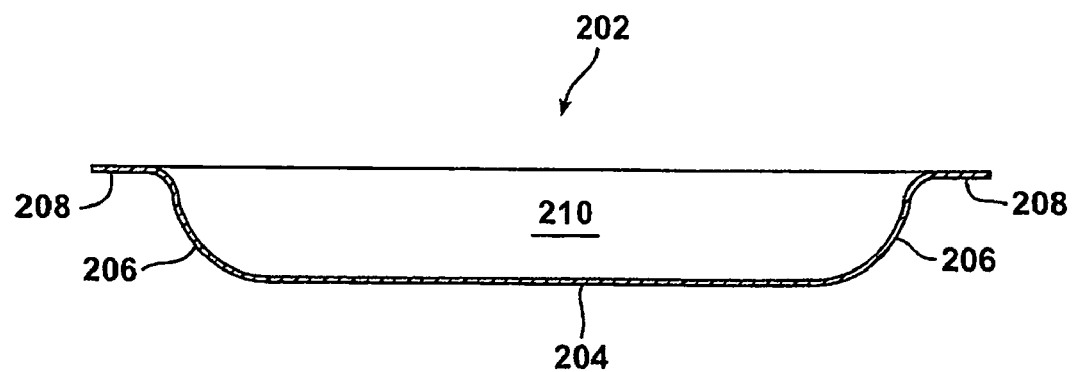
FIG. 29 is a side cross sectional view of a tray in accordance with the invention.

Referring to FIG. 29, tray 202 will typically be made during the food packaging process. Thermoforming equipment, available from e.g. Multivac, is used to convert flat thermoplastic forming web into formed pockets to create trays for containing the food product. Each tray 202 has a tray bottom 204, tray sides 206, and a tray flange 208 along its perimeter to which the printed lidstock laminate can be sealed by heat or other means. The tray bottom 204, tray sides 206 define a tray cavity 210. Prior to any thermoforming step, tray 202 can be of any suitable thickness, e.g. from 10 and 50 mils thick, and any suitable construction.

If a pre-made tray is used in accordance with the invention, it can be rigid or semi-rigid, can be in the form of a flat or shaped tray, and can be made from any suitable material, including solid or expanded embodiments, such as polypropylene, polystyrene, polyamide, 1,4-polymethylpentene (e.g. TPX™ available from Mitsui), or crystallized polyethylene terephthalate (CPET). A tray liner can optionally be used, that adheres to the surface of the pre-made tray on which the food product is to be placed. This liner can be of any suitable design, and can be a multi-layer structure with at least one layer with gas-barrier properties. Such a liner can be adhered to the tray by heat lamination, extrusion lamination, extrusion coating, adhesives, corona treatment, etc.

All ranges disclosed herein are to be understood to encompass any and all sub-ranges subsumed therein. For example, a range of "40 to 80" can include any and all sub-ranges between (and including) the minimum value of 40 and the maximum value of 80, that is, any and all sub-ranges having a minimum value of equal to or greater than 40 and a maximum value of equal to or less than 80, e.g., 40 to 42.

Those skilled in the art will appreciate, after reviewing the disclosure herein, that although the support web is shown as reverse printed, alternatively the outer surface 29 of the substrate film could be printed instead, or in addition. The printability of the particular substrate and support webs used, will be a significant factor in deciding where to install the printed indicia.

The above descriptions are those of embodiments of the invention. All parts and percentages are by weight, unless otherwise indicated or well understood in the art. Except in the claims and the specific examples, or where otherwise expressly indicated, all numerical quantities in this description indicating amounts of material, reaction conditions, use conditions, molecular weights, and/or number of carbon atoms, and the like, are to be understood as modified by the word "about" in describing the broadest scope of the invention. Any reference to an item in the disclosure or to an element in the claim in the singular using the articles "a," "an," "the," or "said" is not to be construed as limiting the item or element to the singular unless expressly so stated. All references to ASTM tests are to the most recent, currently approved, and published version of the ASTM test identified, as of the priority filing date of this application. Each such published ASTM test method is incorporated herein in its entirety by reference.

Terms referring to polymers, such as polyester, polyamide, and polyolefin, refer herein to both homopolymers and copolymers thereof, unless otherwise specified.

It should be noted that both the tamper evidence device of the invention, and the pull tab 106, are thus latent in the laminate lidstock described herein, and it is only when the laminated lidstock is sealed and cut, on packaging equipment, to make individual packages, each with its own lid 500 (see FIG. 20) that the tamper evidence device and pull tab 106 become functional. It will also be noted that if decorative print is disposed in the laminated lidstock, when the laminated lidstock is sealed and cut, on packaging equipment, to make individual packages, each with its own lid 500, the decorative print of the lidstock becomes an integral label for each individual package, eliminating the need for a separate, discrete decorative label.

What is claimed is:

1. A laminated lidstock comprising:
a) a substrate film comprising
   i) an outer laminating layer comprising a thermoplastic material, the outer laminating layer having an outer surface to which a support web can be adhered with a pressure sensitive adhesive; and
   iii) an inner sealing layer comprising a thermoplastic material, the inner layer having a surface which can be sealed to a tray;
b) a support web comprising having an outer surface and an inner surface, comprising a thermoplastic material selected from polyester, polyamide, and polyolefin;
c) a pressure sensitive adhesive disposed between the substrate film and the support web, and covering the outer surface of the outer laminating layer of the substrate film, and the inner surface of the support web except for a clear area disposed near, and spaced from, a first end of the laminated lidstock;
d) a first die cut disposed in the substrate film, but not substantially present in the support web;
e) a second die cut disposed in the support web, but not substantially present in the substrate film;
f) a pull tab spaced, apart from a first end of a package made from the laminated lidstock, comprising an intermediate portion of the support web, spaced from the first die cut, defined by the second die cut, a first side of a package made from the laminated lidstock, and a second side edge of a package made from the laminated lidstock; and
g) a tamper evidence device disposed at one end of the laminated lidstock, the tamper evidence device comprising a first end portion of the support web, defined by a first end of a package made from the laminated lidstock, a first side edge of the package made from the laminated lidstock, a second side edge of the package made from the laminated lidstock, and the second die cut, the tamper evidence device capable of indicating tampering of the package upon removal of the first end portion of the support web from the substrate film;

wherein at least one of the substrate film and the support web carries a registration device.

2. The laminated lidstock of claim 1 wherein at least one of substrate film and the support web comprises an oxygen barrier having an oxygen permeability, of the barrier material, less than 50 cm³ $O_2$/m²·day·atmosphere measured at a thickness of 1 mil (ASTM D 3985).

3. The laminated lidstock of claim 1 wherein the support web comprises a coating, adhered to the outer surface of the support web, comprising the oxygen barrier material.

4. The laminated lidstock of claim 1 wherein the second die cut comprises a score.

5. The laminated lidstock of claim 1 wherein printed indicia is disposed on at least one of
   (a) the outer surface of the outer laminating layer of the substrate film, and
   (b) the inner surface of the support web;
   such that the printed indicia are disposed between the substrate film and the support web.

6. The laminated lidstock of claim 1 wherein the tamper evidence device comprises a printed message disposed on the outside surface of the substrate film, near the first end of the lidstock, and a printed portion disposed on the support web, in covering relationship to the printed message, such that the printed message is hidden until the first end portion of the support web is removed from the substrate film.

7. The laminated lidstock of claim 1 wherein the tamper evidence device comprises a discrete label disposed on the outside surface of the laminated lidstock, and overlapping the second die cut, such that the label is distorted when the first end portion of the support web is removed from the substrate film.

8. A method of making a laminated lidstock comprising:
   a) providing a substrate film comprising:
      i) an outer laminating layer comprising a thermoplastic material, the outer laminating layer having an outer surface to which a support web can be adhered with a pressure sensitive adhesive;
      ii) an inner sealing layer comprising a thermoplastic material, the inner sealing layer having an inner surface which can be sealed to a tray;
   b) providing a support web, having an outer surface and an inner surface, comprising a thermoplastic material selected from polyester, polyamide, and polyolefin;
   c) applying a coating of pressure sensitive adhesive to substantially the entire inner surface of the support web;
   d) providing, in a selected portion of the inner surface of the support web, a clear area near and spaced apart from a first end of the support web;
   e) curing the coating of pressure sensitive adhesive;
   f) bringing the substrate film and the support web together such that the pressure sensitive adhesive is disposed between the substrate film and the support web, covers the outer surface of the substrate film and the inner surface of the support web except for the clear area disposed near and spaced apart from one end of the support web, and adheres the substrate film and the support web together;
   g) making a first die cut in the substrate film, but not substantially in the support web; and
   h) making a second die cut in the support web, but not substantially in the substrate film;
   such that a pull tab is provided, spaced apart from a first side edge of a package made from the laminated lidstock, the pull tab comprising an intermediate portion of the support web, spaced from the first die cut, defined by the second die cut, a first side edge of a package made from the laminated lidstock, and a second side edge of a package made from the laminated lidstock; and a tamper evidence device is provided at one end of the laminated lidstock, comprising a first end portion of the support web, defined by the first end of a package made from the laminated lidstock, the first side edge of a package made from the laminated lidstock, the second side edge of a package made from the laminated lidstock, and the second die cut, the tamper evidence device capable of indicating tampering of the package upon removal of the first end portion of the support web from the substrate film.

9. The method of claim 8 wherein at least one of substrate film and the support web comprises an oxygen barrier having an oxygen permeability, of the barrier material, less than 50 cm³ $O_2$/m²·day·atmosphere measured at a thickness of 1 mil (ASTM D 3985).

10. The method of claim 8 wherein the support web comprises a coating, adhered to the outer surface of the support web, comprising the oxygen barrier material.

11. The method of claim 8 wherein the second die cut comprises a score.

12. The method of claim 8 wherein the printed indicia is disposed on at least one of
    (a) the outer surface of the outer laminating layer of the substrate film, and
    (b) the inner surface of the support web;
    such that the printed indicia are disposed between the substrate film and the support web.

13. The method of claim 8 wherein the tamper evidence device comprises a printed message disposed on the outside surface of the substrate film, near the first end of the lidstock, and a printed portion disposed on the support web, in covering relationship to the printed message, such that the printed message is hidden until the first end portion of the support web is removed from the substrate film.

14. The method of claim 8 wherein the tamper evidence device comprises a discrete label disposed on the outside surface of the laminated lidstock, and overlapping the second die cut, such that the label is distorted when the first end portion of the support web is removed from the substrate film.

15. A tamper evident reclosable package comprising:
    a) a tray comprising a tray bottom, tray sides, and a tray flange, wherein the tray bottom and tray sides define a tray cavity;
    b) a food product disposed in the tray cavity; and
    c) a laminated lidstock, hermetically sealed to the tray flange, comprising
       i) a substrate film comprising
          (a) an outer laminating layer comprising a thermoplastic material, the outer laminating layer having an outer surface to which a support web can be adhered with a pressure sensitive adhesive, and
          (b) an inner sealing layer comprising a thermoplastic material, the inner sealing layer having a surface which can be sealed to the tray flange;
       ii) a support web having an outer surface and an inner surface, comprising a thermoplastic material selected from polyester, polyamide, and polyolefin;
       iii) a pressure sensitive adhesive disposed between the substrate film and the support web, and covering the outer surface of the outer laminating layer of the substrate film and the inner surface of the support web except for a clear area disposed near and spaced apart from a first end of the package;
       iv) a first die cut disposed in the substrate film, but not substantially present in the support web;

v) a second die cut disposed in the support web, but not substantially present in the substrate film;

vi) a pull tab, spaced apart from a first end of the package, the pull tab comprising an intermediate portion of the support web, spaced from the first die cut, defined by the second die cut, a first side edge of the package, and a second side edge of the package; and vii) a tamper evidence device disposed at one end of the laminated lidstock, the tamper evidence device comprising a first end portion of the support web, defined by the first end of the package, the first side edge of the package, the second side edge of the package, and the second die cut, the tamper evidence device capable of indicating tampering of the package upon removal of the first end portion of the support web from the substrate film;

wherein the inner sealant layer of the substrate film is sealed to the tray flange.

16. The package of claim 15 wherein at least one of substrate film and the support web comprises an oxygen barrier having an oxygen permeability, of the barrier material, less than 50 cm$^3$ O$_2$/m$^2$·day·atmosphere measured at a thickness of 1 mil (ASTM D 3985).

17. The package of claim 15 wherein the support web comprises a coating, adhered to the outer surface of the support web, comprising the oxygen barrier material.

18. The package of claim 15 wherein the second die cut comprises a score.

19. The package of claim 15 wherein printed indicia is disposed on at least one of (a) the outer surface of the outer laminating layer of the substrate film, and (b) the inner surface of the support web;

such that the printed indicia are disposed between the substrate film and the support web.

20. The package of claim 15 wherein the tamper evidence device comprises a printed message disposed on the outside surface of the substrate film, near the first end of the lidstock, and a printed portion disposed on the support web, in covering relationship to the printed message, such that the printed message is hidden until the first end portion of the support web is removed from the substrate film.

* * * * *